(12) United States Patent
Fujisaki

(10) Patent No.: US 8,649,105 B2
(45) Date of Patent: Feb. 11, 2014

(54) ZOOM LENS SYSTEM AND IMAGE PICKUP APPARATUS INCLUDING THE SAME

(75) Inventor: Toyokatsu Fujisaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 100 days.

(21) Appl. No.: 13/186,960

(22) Filed: Jul. 20, 2011

(65) Prior Publication Data

US 2012/0019929 A1 Jan. 26, 2012

(30) Foreign Application Priority Data

Jul. 20, 2010 (JP) .................................. 2010-163029

(51) Int. Cl.
*G02B 15/14* (2006.01)

(52) U.S. Cl.
USPC ............................. 359/676; 359/678; 359/683

(58) Field of Classification Search
USPC .......................................... 359/676, 678, 683
See application file for complete search history.

(56) References Cited

U.S. PATENT DOCUMENTS

| 7,382,548 B2 | 6/2008 | Kohno et al. |
| 2006/0132928 A1 | 6/2006 | Nakatani et al. |
| 2009/0290216 A1 | 11/2009 | Fujisaki |
| 2010/0123956 A1* | 5/2010 | Wada ............................. 359/683 |
| 2011/0051257 A1* | 3/2011 | Wada et al. .................... 359/683 |

FOREIGN PATENT DOCUMENTS

| CN | 101533150 | 9/2009 |
| CN | 101655600 | 2/2010 |
| CN | 201110197694.9 | 4/2013 |
| JP | 2007-279541 A | 10/2007 |
| JP | 2008-191291 A | 8/2008 |

* cited by examiner

*Primary Examiner* — Jordan Schwartz
(74) *Attorney, Agent, or Firm* — Rossi, Kimms & McDowell LLP

(57) ABSTRACT

Provided is a zoom lens system including, in order from an object side to an image side: a first lens unit having positive refractive power; a second lens unit having negative refractive power; a prism for bending an optical path; and a rear group including a plurality of lens units, in which the first lens unit is moved to the object side while the second lens unit is moved to the image side with respect to an imaging plane at a telephoto end compared to at a wide angle end, and movement amounts M1 and M2 of the first lens unit and the second lens unit with respect to an image plane in zooming from the wide angle end to the telephoto end, a focal length f2 of the second lens unit, and a focal length ft of an entire system at the telephoto end are respectively set appropriately.

15 Claims, 12 Drawing Sheets

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the same. The present invention is suitable for, for example, a video camera, a digital still camera, a monitor camera, a silver-halide film camera, or a broadcasting camera.

2. Description of the Related Art

In recent years, image pickup apparatuses using a solid-state image pickup element have been becoming more sophisticated in functionality and smaller in size. As a photographing optical system that is used in those image pickup apparatuses, a zoom lens system having a high zoom ratio and small size is demanded.

In order to realize downsizing of a camera and a high zoom ratio of a zoom lens system, there is known a retractable zoom lens system in which an interval between lens units becomes smaller during a non-photographing period than during a photographing period so that the zoom lens system is housed in the camera body during the non-photographing period. In addition, there is known an optical-path bending zoom lens system including a reflecting member for bending an optical path of a photographing optical system by 90 degrees, so as to reduce camera thickness.

U.S. Pat. No. 7,382,548 and Japanese Patent Application Laid-Open No. 2007-279541 disclose a zoom lens system having a zoom ratio of approximately 6 to 10. Specifically, the zoom lens system includes, in order from the object side to the image side, positive, negative, positive, and positive refractive power lens units. A first lens unit and a third lens unit move for zooming. A bending unit for bending an optical path is disposed between a second lens unit and the third lens unit. Japanese Patent Application Laid-Open No. 2008-191291 discloses a zoom lens system that includes, in order from the object side to the image side, positive, negative, positive, negative, and positive refractive power lens units (five lens units). A reflection unit for bending the optical path is disposed in a first lens unit or a second lens unit.

In general, downsizing of a zoom lens system can be realized by increasing refractive power (optical power or reciprocal of focal length) of each lens unit constituting the zoom lens system and by reducing the number of lenses. However, the zoom lens system having such structure has a disadvantage that thicknesses of lenses increase for securing edge thickness due to increases in refractive powers of lens surfaces, and in particular, a front lens effective diameter is increased. As a result, it is difficult to reduce a total lens length. In addition, at the same time, more aberrations including chromatic aberration occur at the telephoto end, and hence it is difficult to correct these aberrations.

Therefore, it is important to appropriately set lens structure of the zoom lens system and to appropriately set location of the reflecting member in the optical path and movement amounts of the lens units in the zooming. In particular, if refractive powers of the lens units or movement amounts of lens units for magnification-varying in the zooming operation are not set appropriately, fluctuations of the aberrations increase in the zooming operation. In addition, it becomes difficult to downsize the entire lens system.

SUMMARY OF THE INVENTION

An object of the present invention is to provide a zoom lens system and an image pickup apparatus using the same, which can easily obtain good quality images with a high zoom ratio and can reduce camera thickness.

The zoom lens system according to the present invention includes, in order from an object side to an image side:
a first lens unit having positive refractive power;
a second lens unit having negative refractive power;
a prism for bending an optical path; and
a rear group including a plurality of lens units,
in which the first lens unit is moved to the object side while the second lens unit is moved to the image side with respect to an imaging plane at a telephoto end compared to at a wide angle end, and the following conditional expressions are satisfied:

$$0.1 < |M1/M2| < 20.0$$

$$0.050 < |f2/ft| < 0.175,$$

where M1 and M2 denote movement amounts of the first lens unit and the second lens unit, respectively, with respect to an image plane in zooming from the wide angle end to the telephoto end, f2 denotes a focal length of the second lens unit, and ft denotes a focal length of an entire system at the telephoto end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, a zoom lens system and an image pickup apparatus including the same according to the present invention are described. The zoom lens system according to the present invention includes, in order from an object side to an image side: a first lens unit having positive refractive power; a second lens unit having negative refractive power; a prism for bending an optical path; and a rear group including a plurality of lens units. The first lens unit is moved to the object side while the second lens unit is moved to the image side with respect to an imaging plane at a telephoto end compared to at a wide angle end.

The rear group includes, in order from the object side to the image side, a third lens unit having negative refractive power, a fourth lens unit having positive refractive power, a fifth lens unit having negative refractive power, and a sixth lens unit having positive refractive power. The third lens unit and the fifth lens unit do not move for zooming, while the fourth lens unit and the sixth lens unit move for zooming. Alternatively, the rear group includes, in order from the object side to the image side, a third lens unit having positive refractive power, and a fourth lens unit having positive refractive power. The third lens unit and the fourth lens unit move for zooming. Alternatively, the rear group includes, in order from the object side to the image side, a third lens unit having positive refractive power, a fourth lens unit having negative refractive power, and a fifth lens unit having positive refractive power. The fourth lens unit does not move for zooming, while the third lens unit and the fifth lens unit move for zooming.

Figure 1:
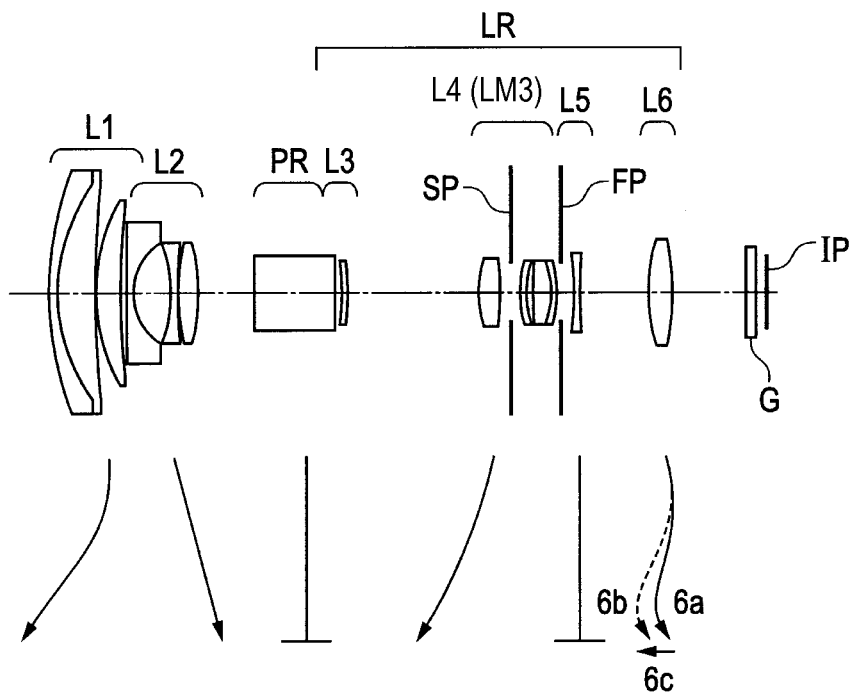
FIG. 1 is a lens cross sectional view at a wide angle end according to Example 1 of the present invention.
Figure 2A:
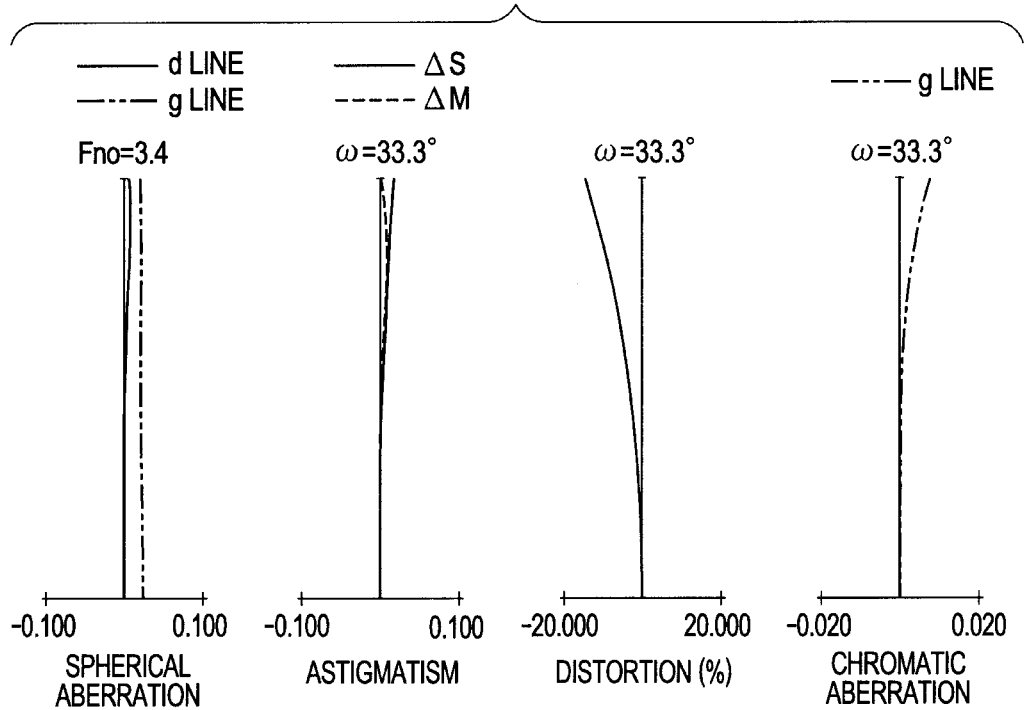
FIGS. 2A, 2B, and 2C are aberration diagrams at the wide angle end, at an intermediate zoom position, and at a telephoto end, respectively, according to Numerical Example 1 corresponding to Example 1 of the present invention.
Figure 2B:
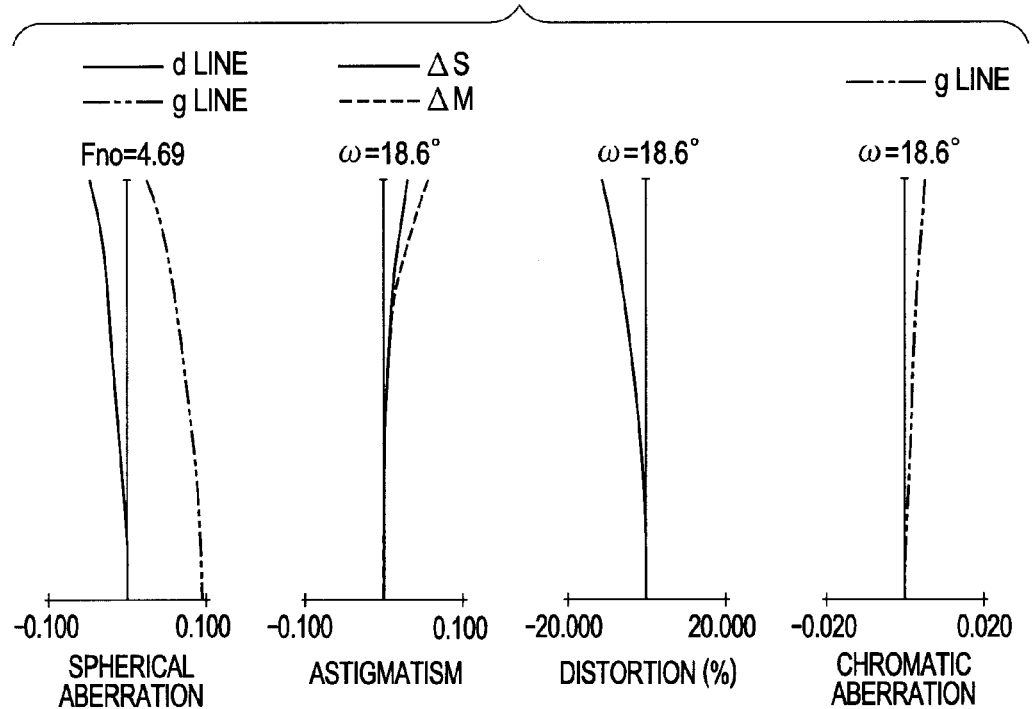
Figure 2C:
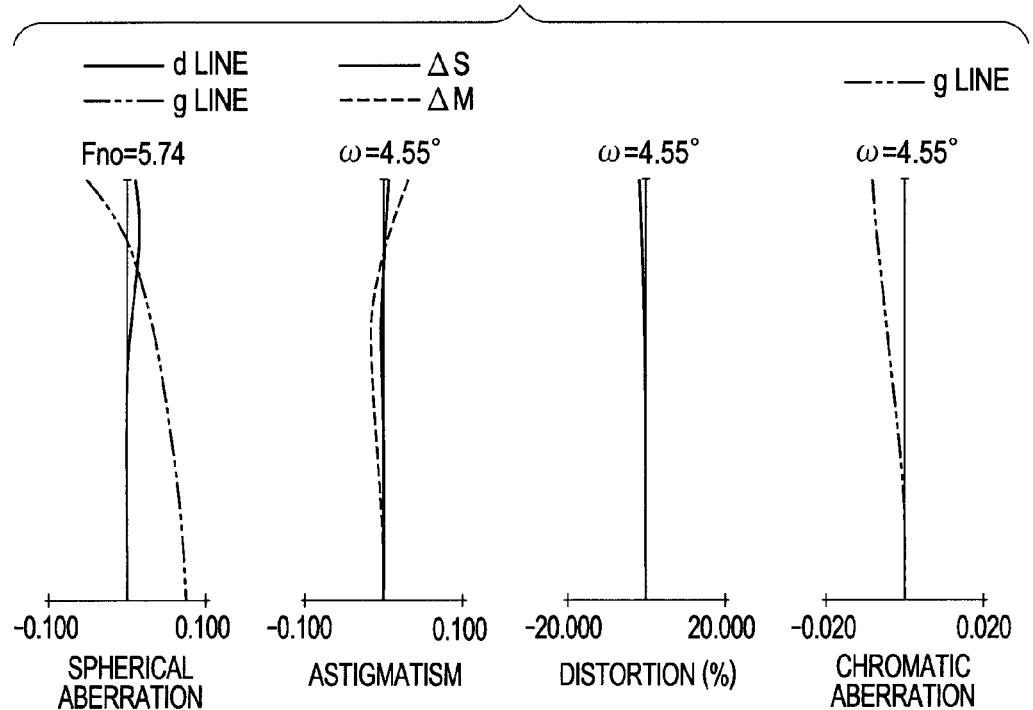
Figure 3:
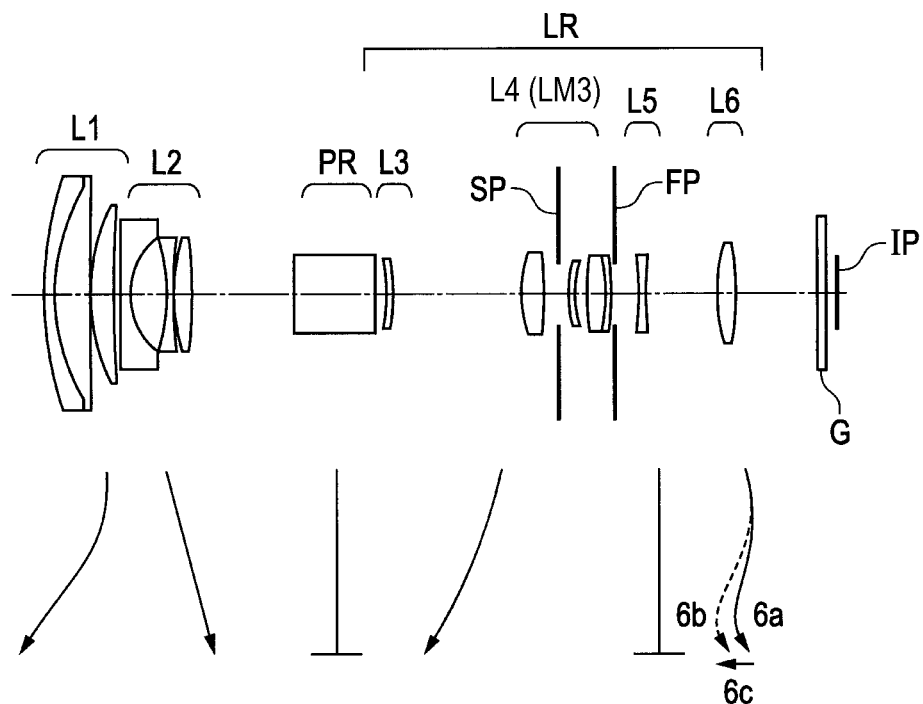
FIG. 3 is a lens cross sectional view at the wide angle end according to Example 2 of the present invention.
Figure 4A:
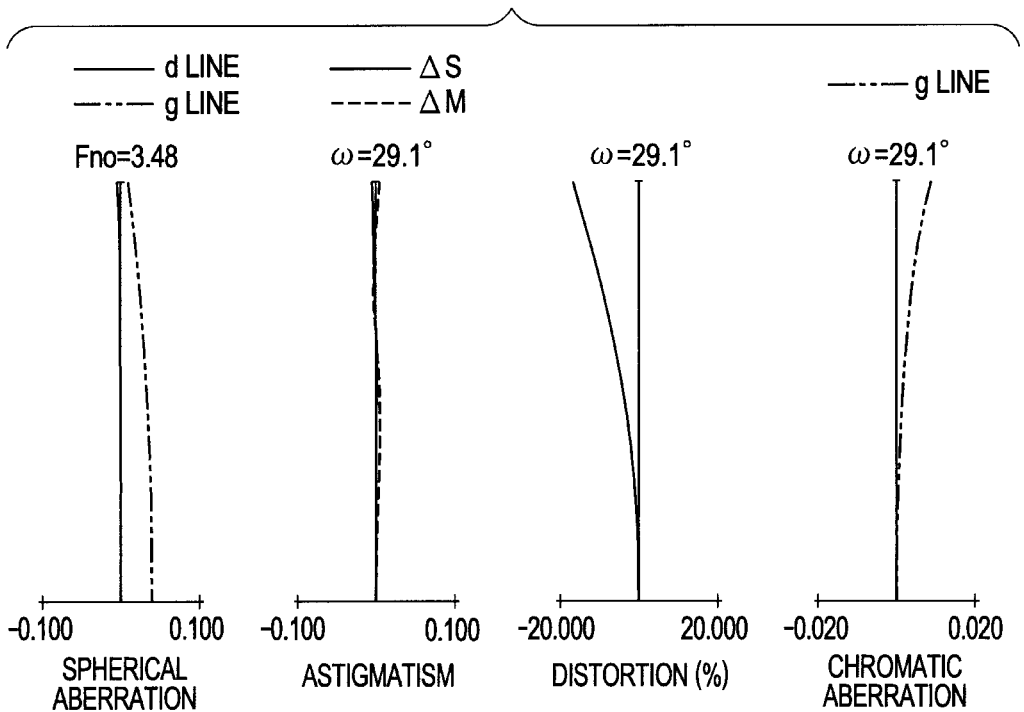
FIGS. 4A, 4B, and 4C are aberration diagrams at the wide angle end, at the intermediate zoom position, and at the telephoto end, respectively, according to Numerical Example 2 corresponding to Example 2 of the present invention.
Figure 4B:
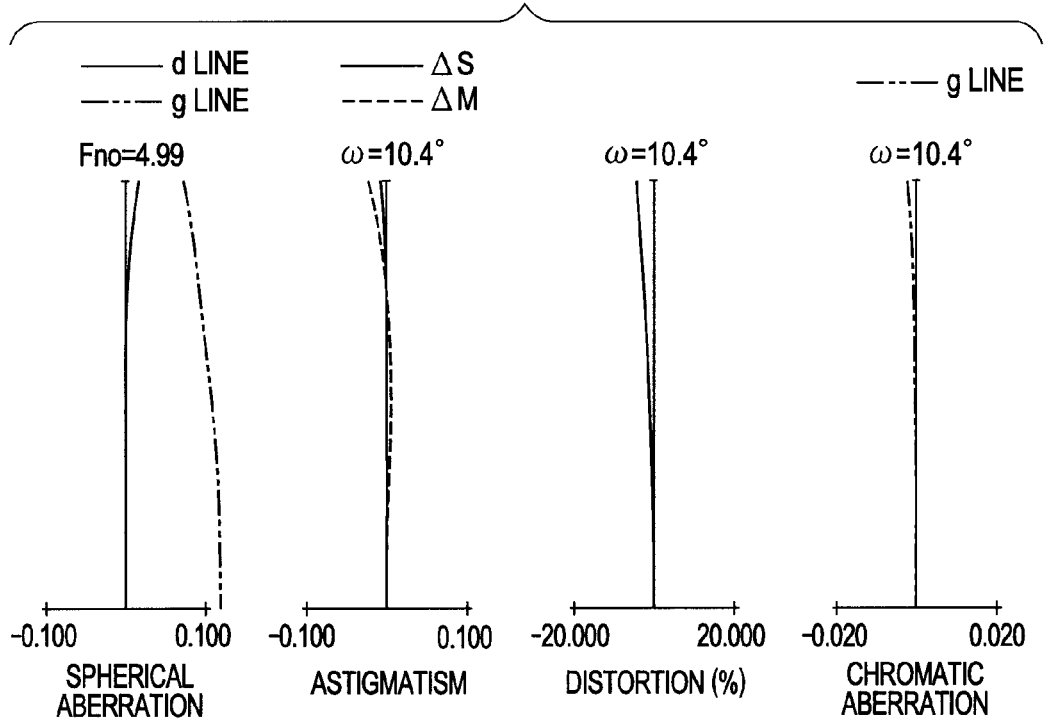
Figure 4C:
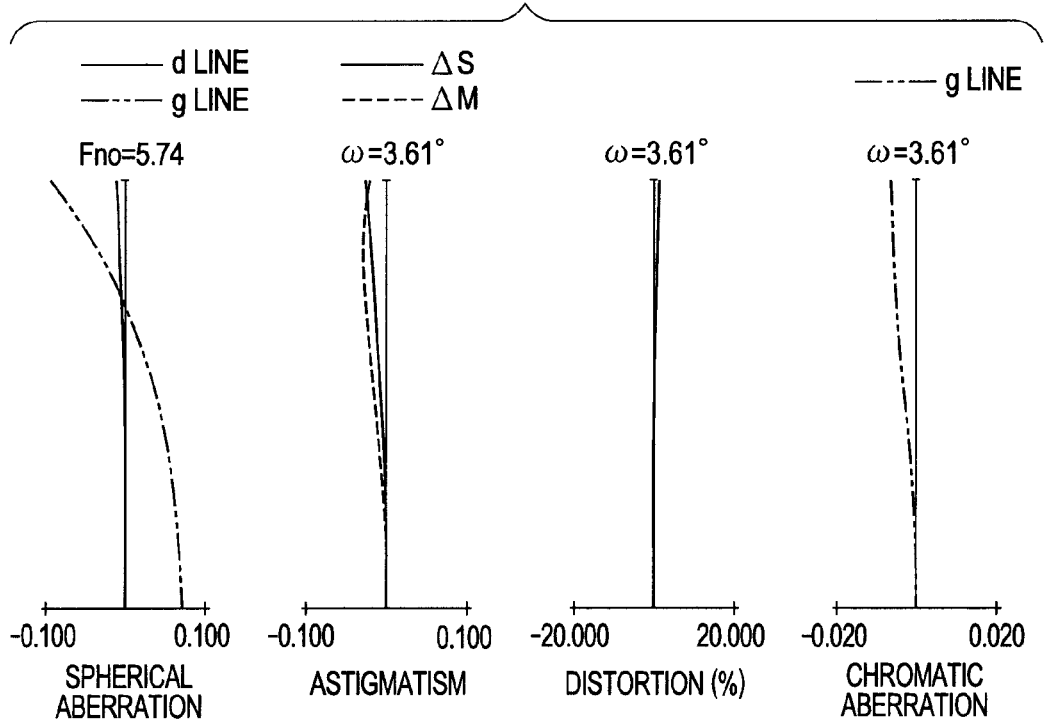
Figure 5:
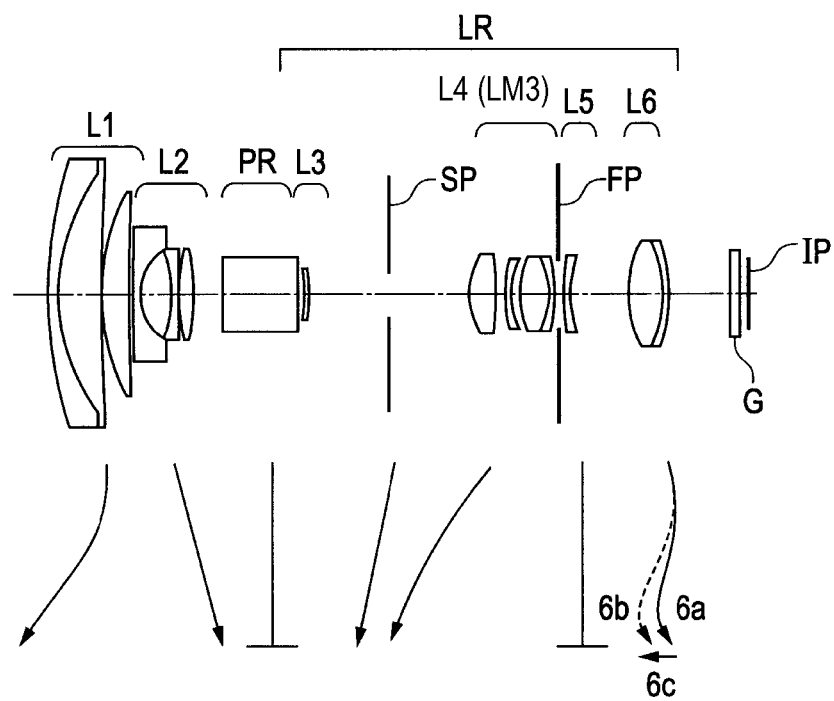
FIG. 5 is a lens cross sectional view at the wide angle end according to Example 3 of the present invention.
Figure 6A:
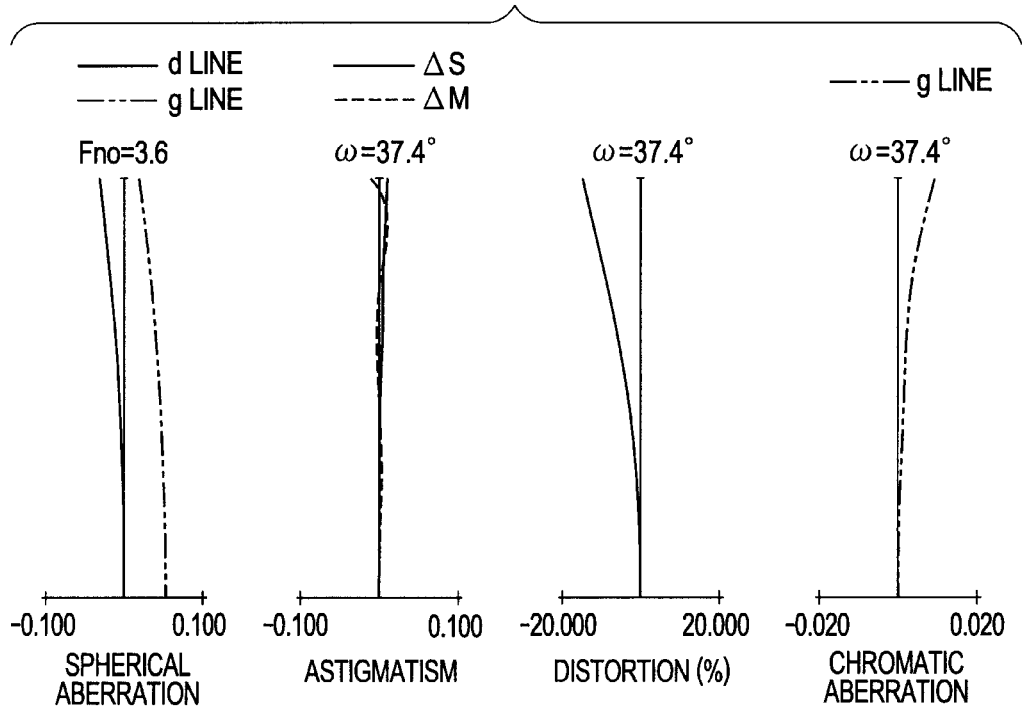
FIGS. 6A, 6B, and 6C are aberration diagrams at the wide angle end, at the intermediate zoom position, and at the telephoto end, respectively, according to Numerical Example 3 corresponding to Example 3 of the present invention.
Figure 6B:
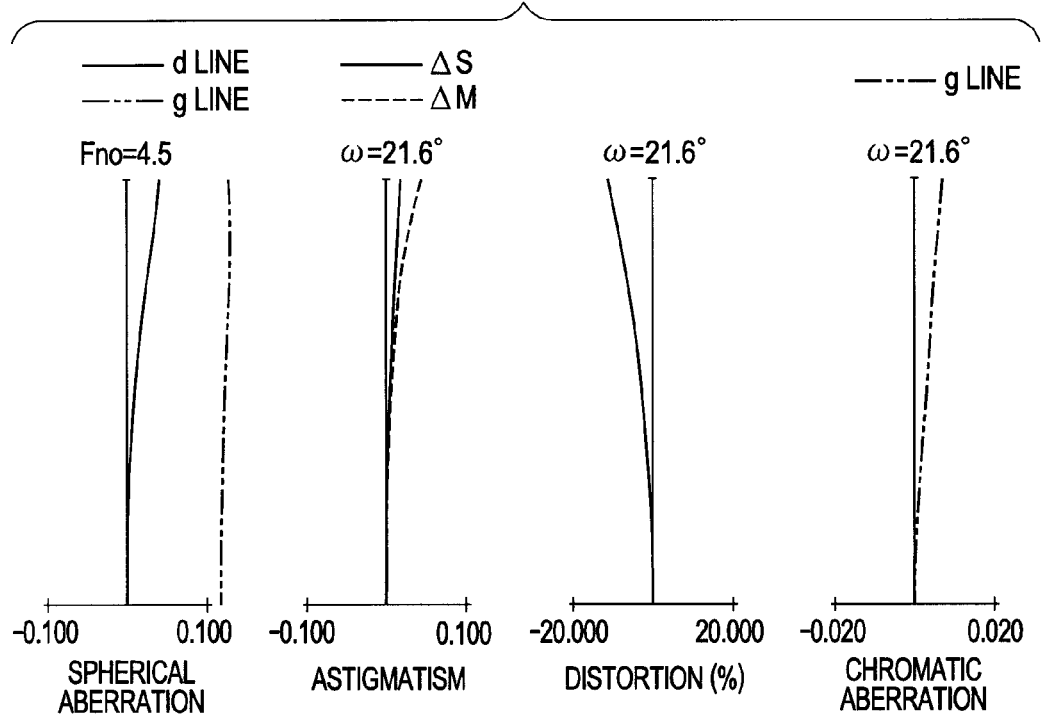
Figure 6C:
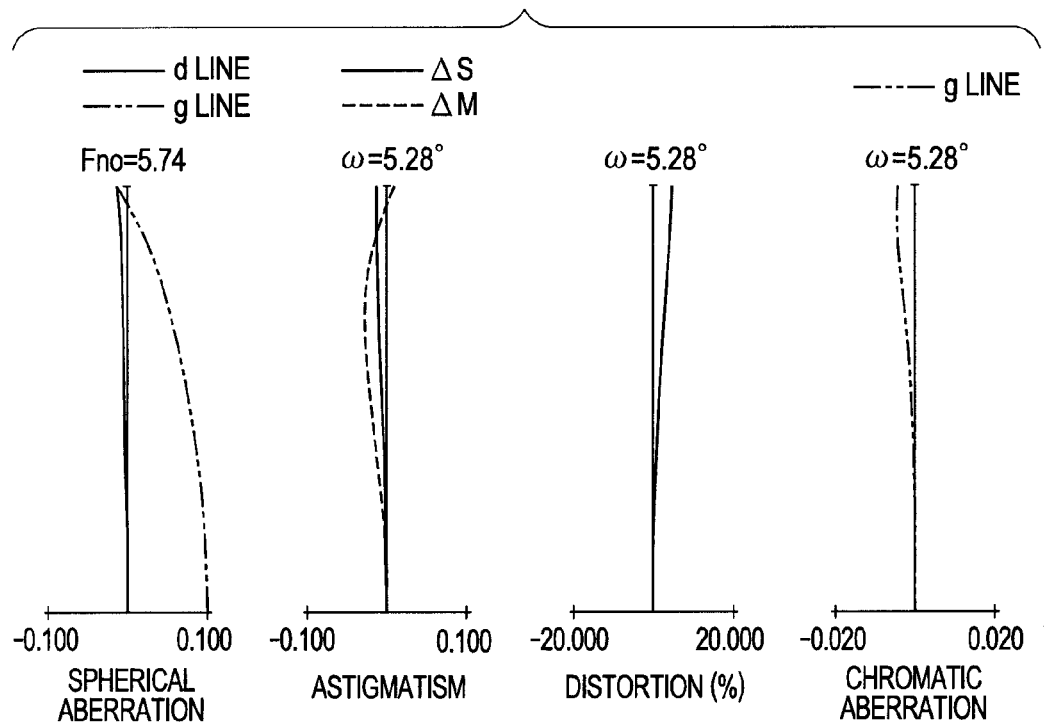
Figure 7:
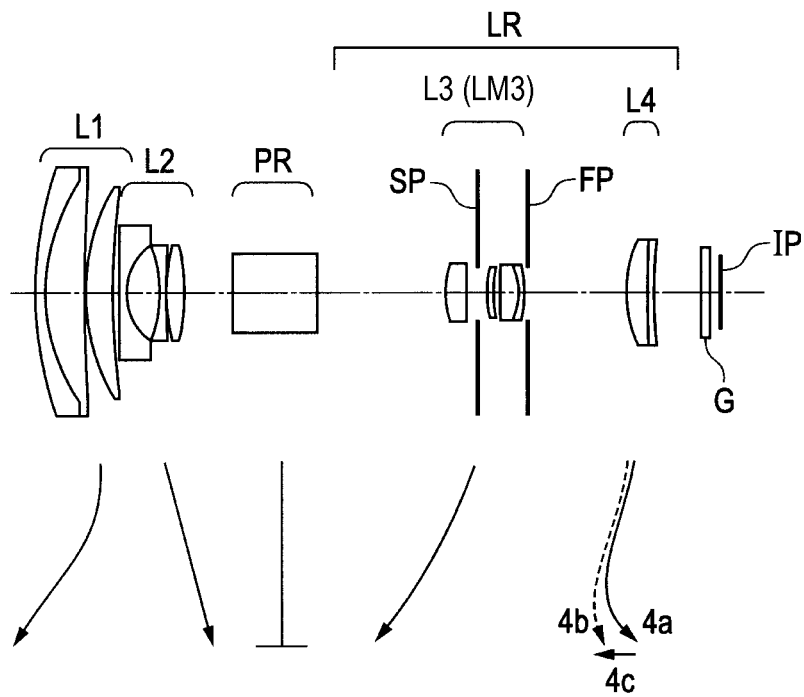
FIG. 7 is a lens cross sectional view at the wide angle end according to Example 4 of the present invention.
Figure 8A:
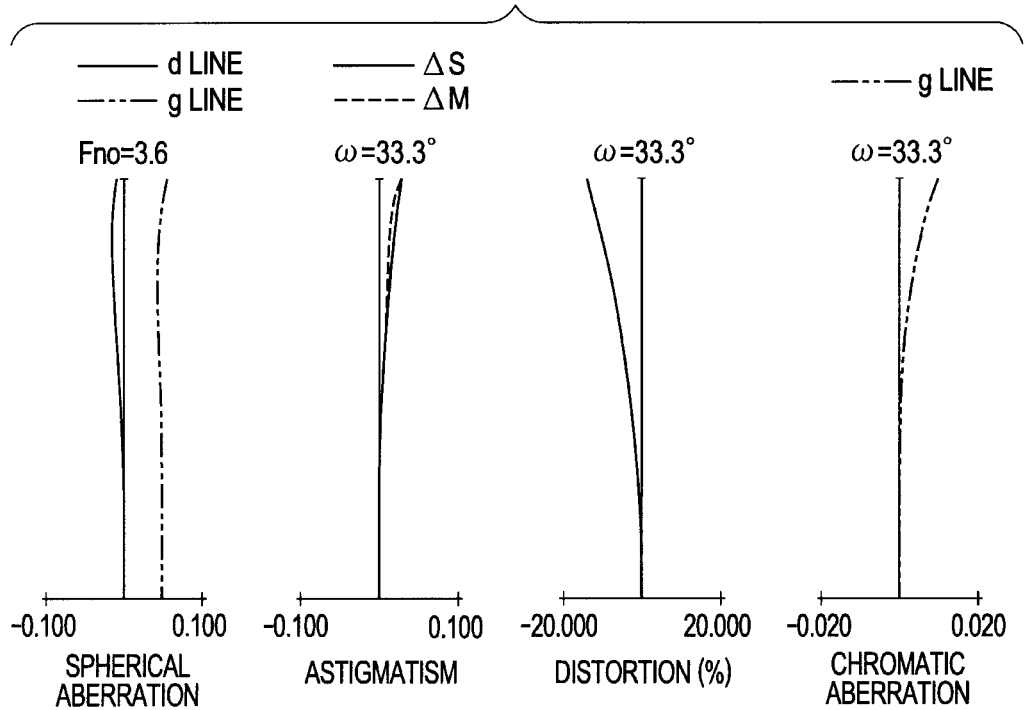
FIGS. 8A, 8B, and 8C are aberration diagrams at the wide angle end, at the intermediate zoom position, and at the telephoto end, respectively, according to Numerical Example 4 corresponding to Example 4 of the present invention.
Figure 8B:
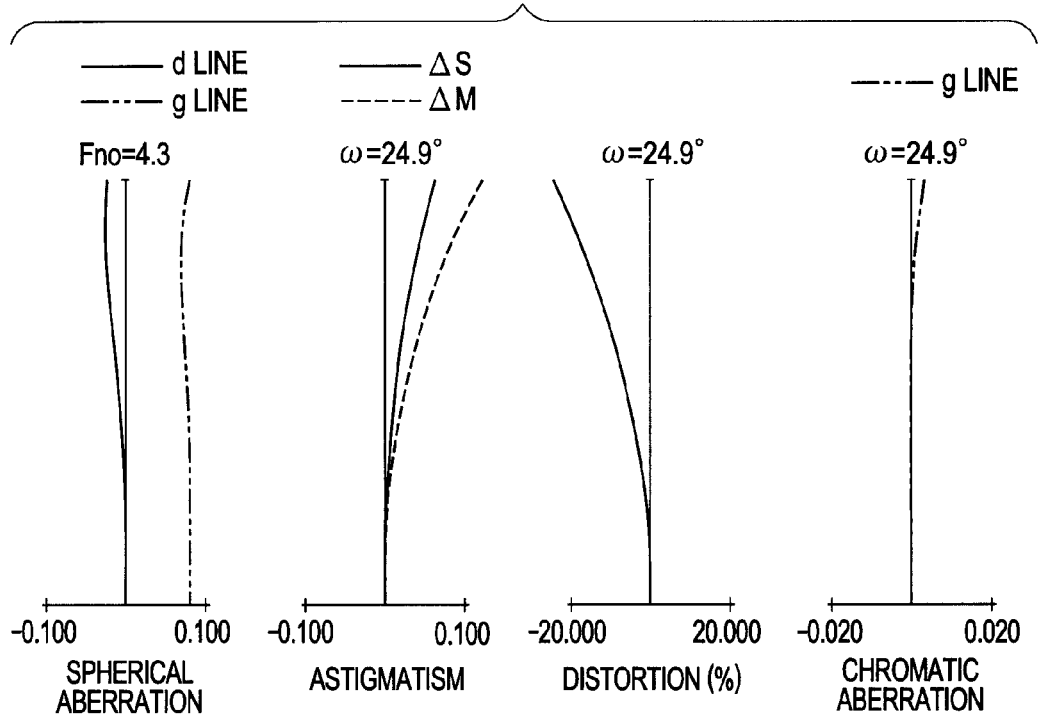
Figure 8C:
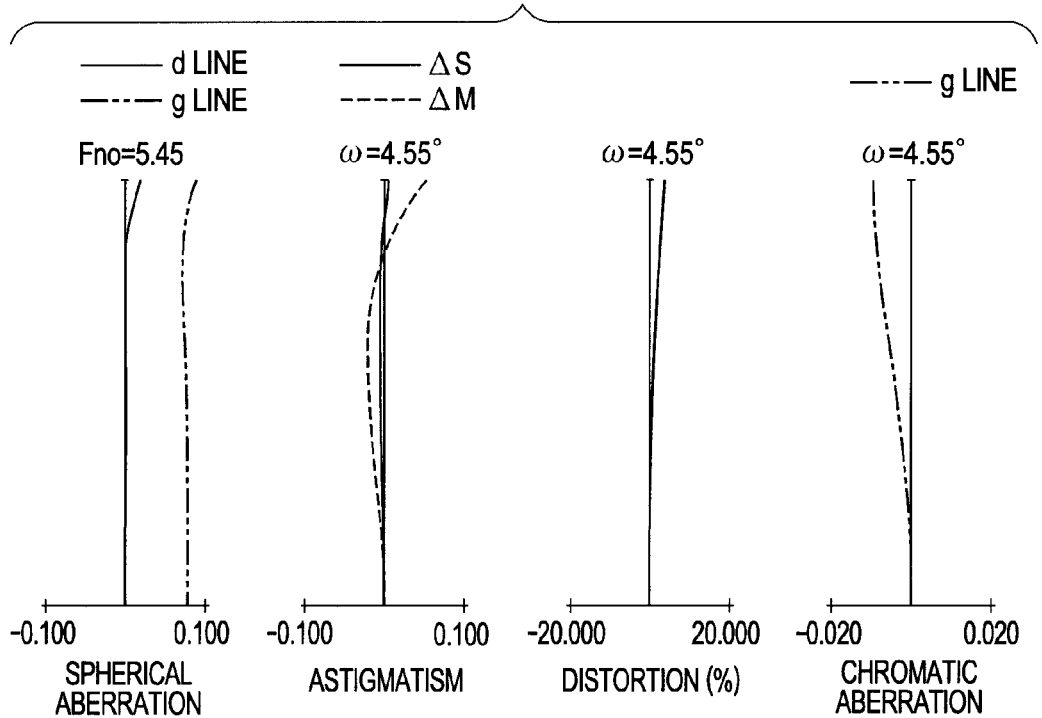
Figure 9:
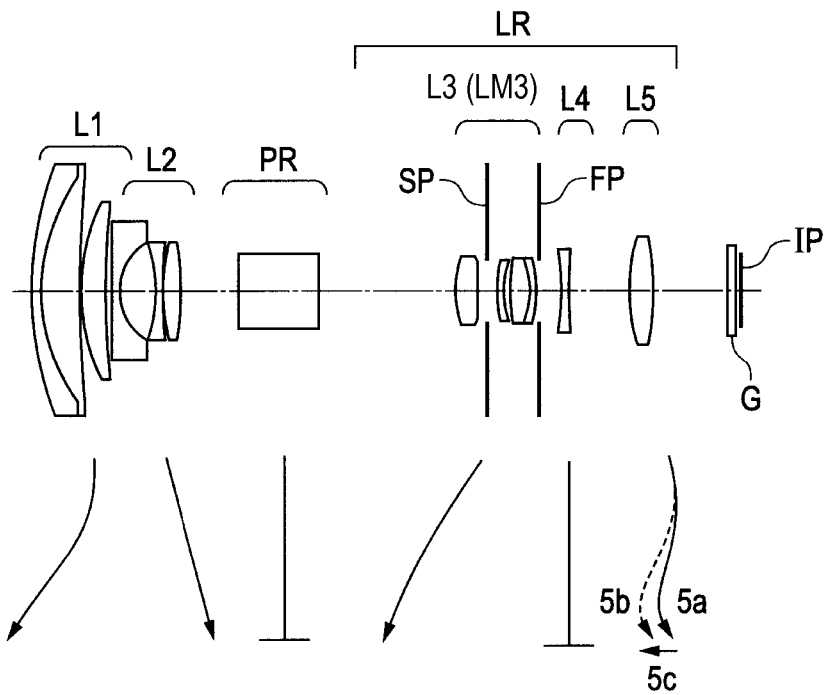
FIG. 9 is a lens cross sectional view at the wide angle end according to Example 5 of the present invention.
Figure 10A:
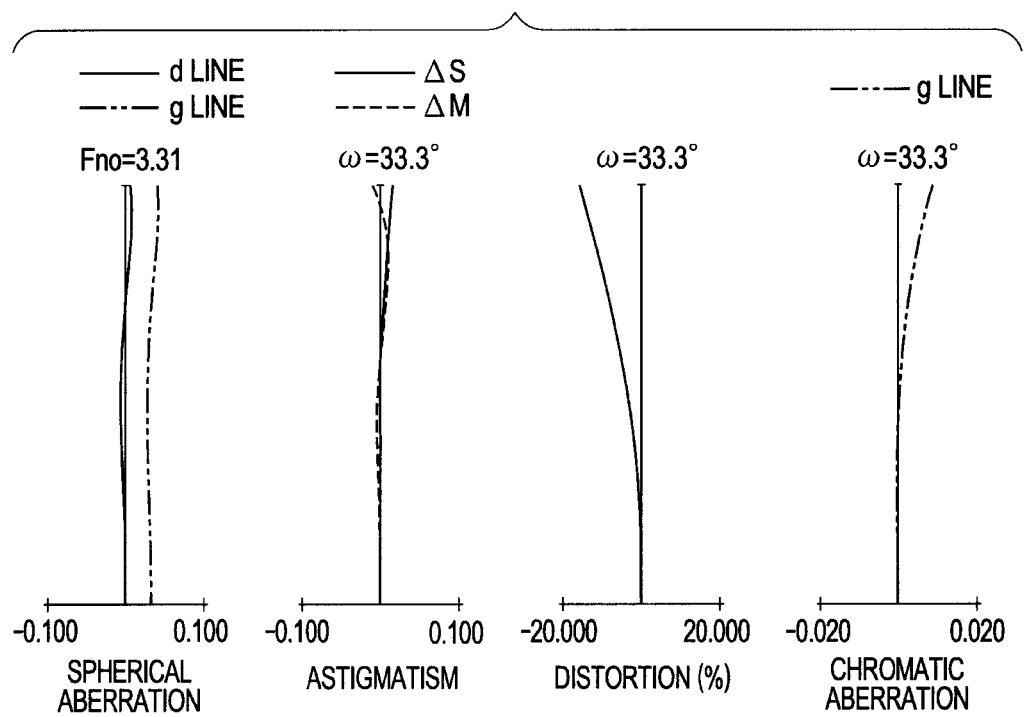
FIGS. 10A, 10B, and 10C are aberration diagrams at the wide angle end, at the intermediate zoom position, and at the telephoto end, respectively, according to Numerical Example 5 corresponding to Example 5 of the present invention.
Figure 10B:
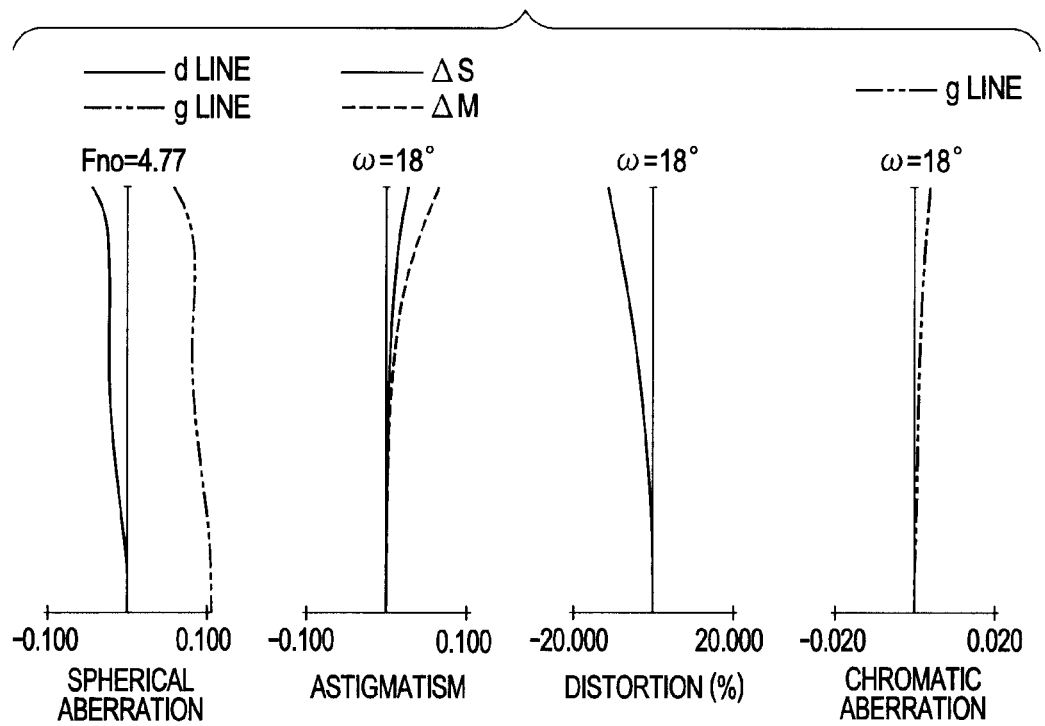
Figure 10C:
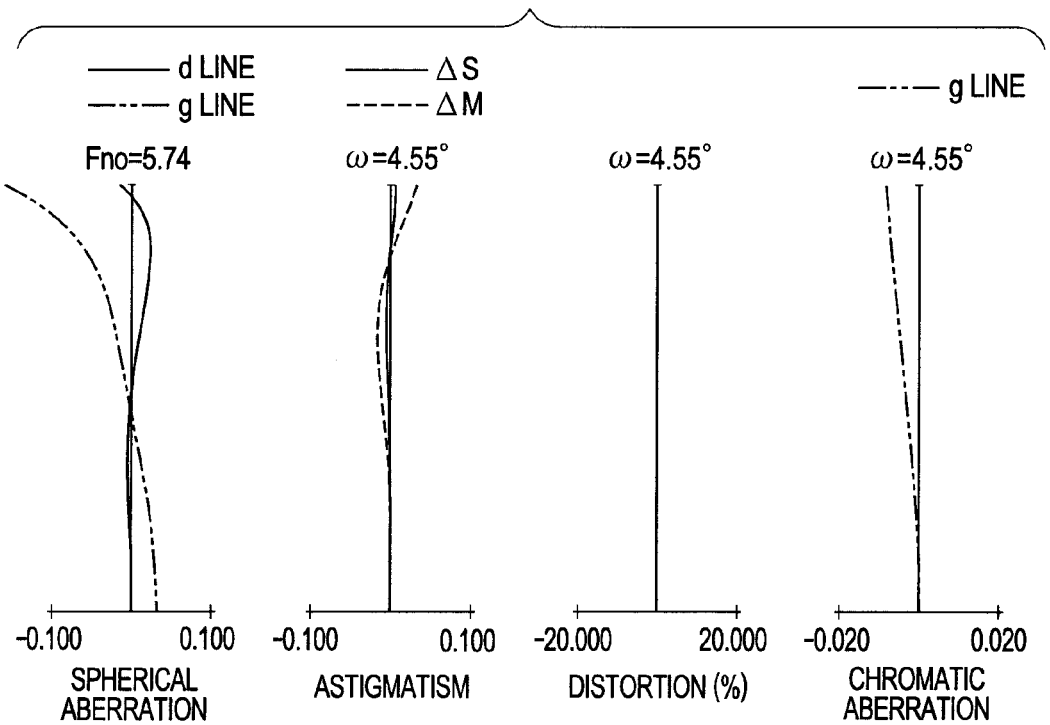
Figure 11:
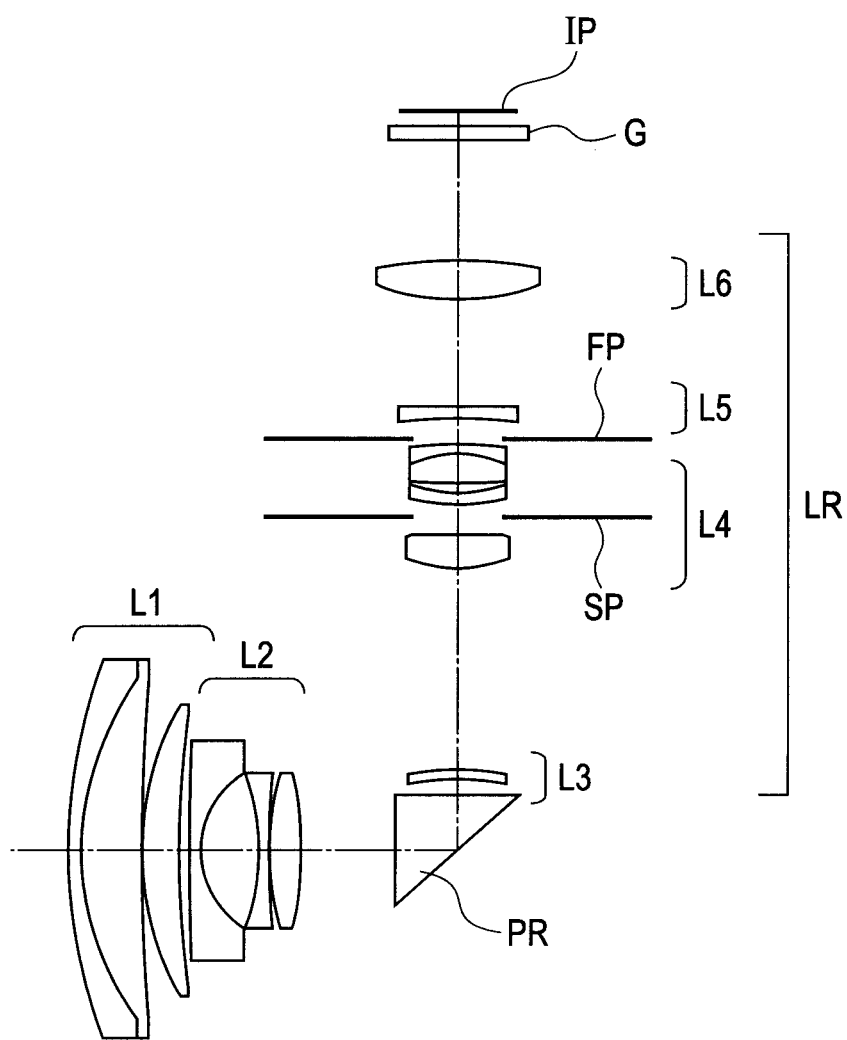
FIG. 11 is a lens cross sectional view of a zoom lens system according to Example 1 of the present invention.

FIG. 1 is a lens cross sectional view at a wide angle end (short focal length end) of the zoom lens system according to Example 1 of the present invention. FIGS. 2A, 2B, and 2C are aberration diagrams at the wide angle end, at an intermediate zoom position, and at a telephoto end (long focal length end), respectively, of the zoom lens system according to Example 1. FIG. 3 is a lens cross sectional view at the wide angle end of a zoom lens system according to Example 2 of the present invention. FIGS. 4A, 4B, and 4C are aberration diagrams at the wide angle end, at the intermediate zoom position, and at the telephoto end, respectively, of the zoom lens system according to Example 2. FIG. 5 is a lens cross sectional view at the wide angle end of a zoom lens system according to Example 3 of the present invention. FIGS. 6A, 6B, and 6C are aberration diagrams at the wide angle end, at the intermediate zoom position, and at the telephoto end, respectively, of the zoom lens system according to Example 3. FIG. 7 is a lens cross sectional view at the wide angle end of a zoom lens system according to Example 4 of the present invention. FIGS. 8A, 8B, and 8C are aberration diagrams at the wide angle end, at the intermediate zoom position, and at the telephoto end, respectively, of the zoom lens system according to Example 4. FIG. 9 is a lens cross sectional view at the wide angle end of a zoom lens system according to Example 5 of the present invention. FIGS. 10A, 10B, and 10C are aberration diagrams at the wide angle end, at the intermediate zoom position, and at the telephoto end, respectively, of the zoom lens system according to Example 5. In each example, the optical path is bent by an inner reflection surface disposed in a prism, but the optical path in each lens cross sectional view is illustrated in an extended state for convenience sake. FIG. 11 is a lens cross sectional view when the optical path is bent by the inner reflection surface disposed in the reflection unit (prism) according to Example 1 of the present invention.

Figure 12:
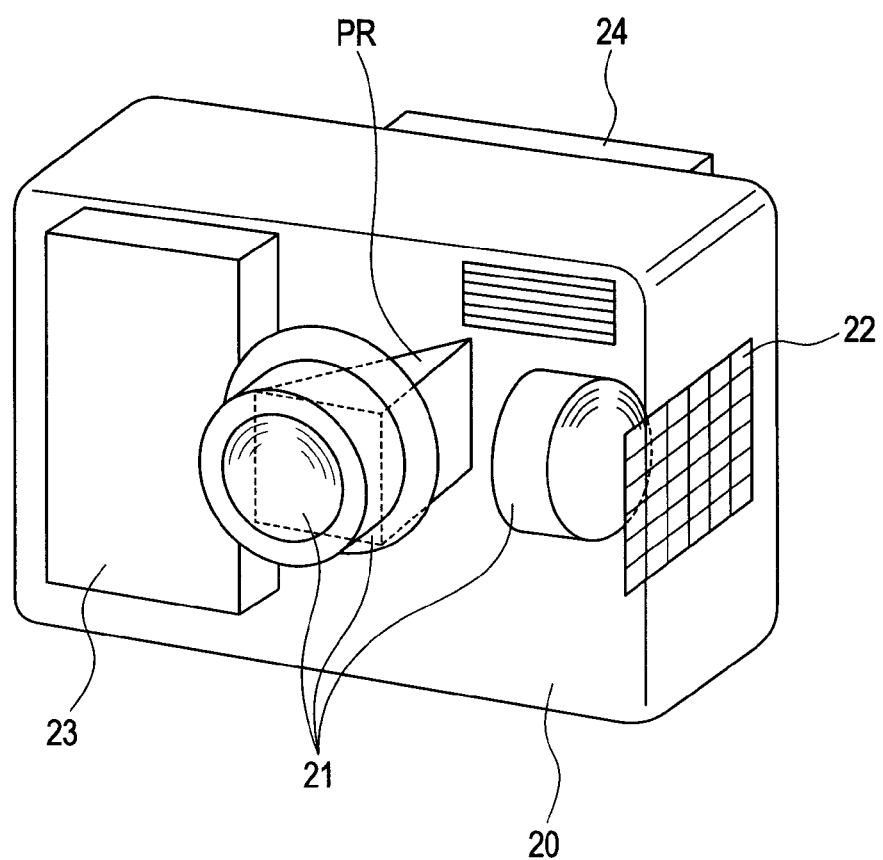
FIG. 12 is a schematic view of a main part of an image pickup apparatus according to the present invention.

FIG. 12 is a schematic view of a main part of a camera (image pickup apparatus) including the zoom lens system according to the present invention. The zoom lens system of each example is a photographing lens system that is used for an image pickup apparatus such as a video camera, a digital camera, and a silver halide film camera. In the lens cross sectional view, the left side corresponds to a subject side (object side) (front), and the right side corresponds to the image side (rear). In the lens cross sectional view, an order of a lens unit from the object side is denoted by i, and an i-th lens unit is denoted by Li. The zoom lens system includes: a rear group LR including a plurality of lens units; an aperture stop SP that restricts the light beam; a flare stop FP that cuts off undesirable light; a prism (reflection unit) PR, which has an inner reflection surface so as to bend the optical path by 90 degrees or by approximately 90 degrees; and an optical block G corresponding to an optical filter, a face plate, a crystal low-pass filter, an infrared cut filter, or the like.

As an image plane IP, an imaging plane of a solid-state image pickup element (photoelectric transducer element) such as a charge coupled device (CCD) sensor or a complementary metal oxide semiconductor (CMOS) sensor is disposed when the zoom lens system is used as a photographing optical system of a video camera or a digital still camera. Alternatively, when the zoom lens system is used for a silver-halide film camera, a photosensitive surface corresponding to a film surface is disposed. In the aberration diagrams, d and g denote a d-line and a g-line, respectively. ΔM and ΔS denote a meridional image plane and a sagittal image plane, respectively. Lateral chromatic aberration is expressed by the g-line. Symbol ω denotes a half field angle (half value of a photographing field angle), and Fno denotes an F-number. Further, in each example described below, the wide angle end and the telephoto end refer to zoom positions when the lens unit for magnification is positioned at each end of a mechanically movable range along an optical axis.

The zoom lens system in each example includes, in order from the object side to the image side, a first lens unit L1 having positive refractive power, a second lens unit L2 having negative refractive power, the prism PR for bending the optical path, and the rear group LR including a plurality of lens units. In magnification-varying from the wide angle end to the telephoto end, the first lens unit L1 moves to the object side relative to the imaging plane while the second lens unit L2 moves to the image side relative to the imaging plane at the telephoto end than the wide angle end so as to perform zooming.

In each example, the first lens unit L1 is moved to be closer to the object side at the telephoto end than at the wide angle end in the zooming. Thus, the total lens length at the wide angle end is decreased, and hence the front lens effective diameter is reduced, and a high zoom ratio is obtained. In particular, in each example, the first lens unit L1 having positive refractive power is moved to the object side so that the second lens unit L2 has a large magnification-varying effect. Thus, without increasing refractive powers of the first lens unit L1 and the second lens unit L2 so much, a high zoom ratio of approximately 10 is obtained.

Movement amounts of the first lens unit L1 and the second lens unit L2 with respect to the image plane in zooming from the wide angle end to the telephoto end are denoted by M1 and M2, respectively. The focal length of the second lens unit L2 is denoted by f2, and the focal length of the entire system at the telephoto end is denoted by ft. Then, the following conditional expressions are satisfied.

$$0.1<|M1/M2|<20.0 \quad (1)$$

$$0.050<|f2/ft|<0.175 \quad (2)$$

Here, each of the relative movement amounts M1 and M2 is a displacement (difference between positions) of each lens unit with respect to the image plane in the optical axis direction at the telephoto end compared to at the wide angle end, and the sign thereof is negative on the object side while it is positive on the image side.

The conditional expression (1) defines an appropriate range of the relative movement amounts M1 and M2 of the first lens unit L1 and the second lens unit L2 with respect to the image plane in the magnification-varying from the wide angle end to the telephoto end, which contributes to the magnification-varying, so as to realize a high zoom ratio while reducing the front lens diameter. In general, a wide field angle and a high zoom ratio can be obtained by increasing refractive power of the lens unit that contributes to the magnification-varying and by increasing the movement amount. However, if the refractive power is increased too much, it becomes difficult to correct aberration, with the result that good performance cannot be obtained. In addition, if the number of constituent lenses is increased for correcting aberration, it becomes difficult to realize a thin camera. Further, if the movement amount is set to be too large, the total lens length also becomes large, with the result that it is difficult to downsize the camera. If the ratio between the movement amounts M1 and M2 of the first lens unit L1 and the second lens unit L2 becomes small beyond the lower limit of the conditional expression (1), refractive power of the first lens unit L1 needs to be increased for realizing a high zoom ratio with a small movement amount. As a result, the front lens effective diameter is increased. In addition, it becomes difficult to correct spherical aberration and axial chromatic aberration mainly at the telephoto end, and to correct coma aberration in a zoom intermediate range. In addition, because refractive power of the first lens unit L1 is increased, tilt/parallel decentering sensitivity of each lens unit is increased. As a result, it becomes difficult to obtain good optical performance in assembling the camera and in normal photographing, because of decentering due to backlash or play of a mechanical component.

If the ratio between the movement amounts M1 and M2 of the first lens unit L1 and the second lens unit L2 becomes large beyond the upper limit of the conditional expression (1), refractive power of the second lens unit L2 needs to be increased for realizing a high zoom ratio with a small movement amount. Then, it becomes difficult to correct field curvature and lateral chromatic aberration mainly at the wide angle end, to correct axial chromatic aberration at the telephoto end, and to suppress image plane fluctuation in the entire zoom range at the periphery of the screen. In addition, the tilt/parallel decentering sensitivity of each lens unit is increased because refractive power of the second lens unit L2 that mainly contributes to the magnification-varying is increased. Therefore, it becomes difficult to obtain good optical performance in assembling the camera and in normal photographing, because of decentering due to backlash or play of a mechanical component. Further, when the movement amount M1 of the first lens unit L1 is increased, image blur increases in the zooming, with the result that it becomes difficult to obtain good optical performance when taking a moving image.

The conditional expression (2) is defined for setting an appropriate ratio between a focal length f2 of the second lens unit L2 and a focal length ft of the entire system at the telephoto end, so as to realize a high zoom ratio while obtaining good optical performance in the entire zoom range. If the focal length of the second lens unit L2 becomes small beyond the lower limit of the conditional expression (2) with respect to the focal length ft of the entire system, it becomes difficult to correct field curvature and lateral chromatic aberration mainly at the wide angle end, and to suppress image plane fluctuation in the entire zoom range at the periphery of the screen. In addition, because refractive power of the second lens unit L2 that mainly contributes to the magnification-varying is increased, the tilt/parallel decentering sensitivity of each lens unit is increased. As a result, it becomes difficult to obtain good optical performance in assembling the camera and in normal photographing, because of decentering due to backlash or play of a mechanical component. If the focal length of the second lens unit L2 becomes large beyond the upper limit of the conditional expression (2) with respect to the focal length ft of the entire system, the movement amount of the second lens unit L2 needs to be increased for realizing a high zoom ratio. As a result, the total lens length increases, and the camera becomes large. In addition, effective diameters of the first lens unit and the second lens unit increase, which is not good.

As described above, the movement amounts of the first lens unit L1 and the second lens unit L2 at the wide angle end and at the telephoto end, and refractive power of the second lens unit L2 are set appropriately so that the conditional expressions (1) and (2) are satisfied. Thus, the small zoom lens system is provided, which has a high zoom ratio and a small front lens effective diameter while maintaining high optical performance in the entire zoom range.

Note that it is more preferred to set the numerical value ranges of the conditional expressions (1) and (2) as follows.

$$0.2<|M1/M2|<15.0 \quad (1a)$$

$$0.100<|f2/ft|<0.175 \quad (2a)$$

It is more preferred to set the numerical value ranges of the conditional expressions (1a) and (2a) as follows.

$$0.36<|M1/M2|<12.00 \quad (1b)$$

$$0.120<|f2/ft|<0.170 \quad (2b)$$

With the structure described above, it is possible to obtain a small zoom lens system having a wide field angle, a high zoom ratio, and high optical performance over the entire zoom range.

In the present invention, it is more preferred to satisfy one or more of the following conditions. A focal length of the first lens unit L1 is denoted by f1. A focal length of the entire system at the wide angle end is denoted by fw. Lateral magnifications of the second lens unit L2 at the wide angle end and at the telephoto end are denoted by β2w and β2t, respectively.

An interval at the telephoto end between the second lens unit L2 and the third lens unit, which is the third unit from the object side and moves for zooming, is denoted by DM23t. A focal length of the third lens unit, which is the third unit from the object side and moves for zooming, is denoted by f3. Then, it is preferred to satisfy one or more of the following conditional expressions.

$$4.5<f1/fw<10.0 \quad (3)$$

$$3.0<\beta2t/\beta2w<6.0 \quad (4)$$

$$0.02<M2/ft<0.20 \quad (5)$$

$$1.0<DM23t/fw<10.0 \quad (6)$$

$$0.1<|f2/f3|<0.6 \quad (7)$$

The conditional expression (3) defines an appropriate ratio between the focal length f1 of the first lens unit L1 and the focal length fw of the entire system at the wide angle end so as to downsize the entire system while realizing a high zoom ratio. If the focal length f1 of the first lens unit L1 becomes too small beyond the lower limit of the conditional expression (3) with respect to the focal length fw of the entire system at the wide angle end, it becomes difficult to correct lateral chromatic aberration mainly at the wide angle end when a wide field angle is realized. In addition, axial chromatic aberration and lateral chromatic aberration increase at the telephoto end when a high zoom ratio is realized. In addition, it becomes difficult to secure the edge thickness of the positive lens constituting the first lens unit L1. As a result, the effective diameter needs to be increased for manufacturing, and the front lens effective diameter is increased, which is not good. Further, decentering sensitivity of the first lens unit L1 is increased in the assembling process, resulting in deteriorated optical performance, which is not good. If the focal length f1 of the first lens unit L1 becomes large beyond the upper limit of the conditional expression (3) with respect to the focal length fw of the entire system at the wide angle end, the movement amount of the first lens unit L1 is increased in the zooming operation when a high zoom ratio is realized. Therefore, the entire system becomes large. In addition, it becomes difficult to correct spherical aberration at the telephoto end. Other than that, the movement amount of the first lens unit L1 is increased in the zooming operation, and hence the image blur in the zooming is increased. As a result, it becomes difficult to obtain good optical performance when taking a moving image.

The conditional expression (4) defines appropriate lateral magnifications $\beta 2w$ and $\beta 2t$ of the second lens unit L2 at the wide angle end and at the telephoto end for obtaining a high zoom ratio when the entire system is small. If the lateral magnification $\beta 2w$ of the second lens unit L2 at the wide angle end is too large beyond the lower limit of the conditional expression (4) with respect to the lateral magnification $\beta 2t$ at the telephoto end, the movement amount of the second lens unit L2 in the zooming becomes large. Therefore, the total lens length is increased to be a large size, which is not good. If the lateral magnification $\beta 2w$ of the second lens unit L2 at the wide angle end becomes too small beyond the upper limit value of the conditional expression (4) compared to the lateral magnification $\beta 2t$ at the telephoto end, it becomes difficult to correct coma aberration and image plane fluctuation over the entire zoom range. In addition, because the front lens effective diameter is increased, it becomes difficult to downsize the entire system.

The conditional expression (5) defines an appropriate ratio between the movement amount M2 of the second lens unit L2 in the zooming and the focal length ft of the entire system at the telephoto end for obtaining a high zoom ratio when the entire system is small. If the movement amount M2 of the second lens unit L2 is too small beyond the lower limit value of the conditional expression (5) compared to the focal length ft of the entire system at the telephoto end, it is necessary to increase the refractive power of the second lens unit L2 that contributes mainly to the magnification-varying for realizing a high zoom ratio. As a result, it becomes difficult to correct field curvature and lateral chromatic aberration mainly at the wide angle end, and to suppress image plane fluctuation in the entire zoom range at the periphery of the screen. In addition, the tilt/parallel decentering sensitivity of each lens unit is increased. As a result, it becomes difficult to obtain good optical performance in assembling the camera and in normal photographing, because of decentering due to backlash or play of a mechanical component. If the movement amount M2 of the second lens unit L2 becomes large beyond the upper limit of the conditional expression (5) compared to the focal length ft of the entire system at the telephoto end, the total lens length increases for realizing a high zoom ratio, resulting in a large size of the entire camera. In addition, effective diameters of the first lens unit and the second lens unit increase, which is not good.

The conditional expression (6) defines an appropriate ratio of the distance DM23t on the optical axis between the second moving lens unit L2 and a third moving lens unit L3 from the object side at the telephoto end to the focal length fw of the entire system at the wide angle end, for obtaining a high zoom ratio when the entire system is small. Here the third moving lens unit L3 corresponds to a fourth lens unit L4 in Examples 1 to 3, a third lens unit L3 in Example 4, and the third lens unit L3 in Example 5. If the distance DM23t on the optical axis between the second and third moving lens units L2 and L3 from the object side at the telephoto end becomes smaller than the focal length fw of the entire system at the wide angle end beyond the lower limit value of the conditional expression (6), vignetting of the peripheral light amount occurs because of the prism for bending the optical path. As a result, it becomes difficult to obtain good optical performance. If the distance DM23t on the optical axis between the second and third moving lens units from the object side at the telephoto end becomes larger than the focal length fw of the entire system at the wide angle end beyond the upper limit of the conditional expression (6), the total lens length is increased. As a result, it becomes difficult to downsize the entire system. In addition, in order to obtain a high zoom ratio, it is necessary to increase the refractive powers of the second and third moving lens units L2 and L3. As a result, the tilt/parallel decentering sensitivity of each lens unit is increased. As a result, it becomes difficult to obtain good optical performance in assembling the camera and in normal photographing, because of decentering due to backlash or play of a mechanical component.

The conditional expression (7) defines an appropriate ratio between the focal lengths f2 and f3 of the second and third moving lens units L2 and L3 from the object side for obtaining a high zoom ratio when the entire system is small. If the focal length f2 is too small beyond the lower limit value of the conditional expression (7) compared to the focal length f3, it becomes difficult to correct field curvature and lateral chromatic aberration mainly at the wide angle end, and to suppress image plane fluctuation in the entire zoom range at the periphery of the screen. In addition, the total lens length after bending the optical path by the prism becomes long, with the result that it becomes difficult to downsize the camera. Further, the tilt/parallel decentering sensitivity of each lens unit is increased. As a result, it becomes difficult to obtain good optical performance in assembling the camera and in normal photographing, because of decentering due to backlash or play of a mechanical component. If the focal length f2 becomes too large beyond the upper limit of the conditional expression (7) compared to the focal length f3, the total lens length becomes long for obtaining a high zoom ratio, and hence it becomes difficult to downsize the camera.

Note that in order to further decrease aberration fluctuation in the aberration correction and in the zooming operation while downsizing the entire lens system, it is preferred to set the numerical value ranges of the conditional expressions (3) to (6) as follows.

$$4.6 < f1/fw < 9.0 \tag{3a}$$

$$3.0 < \beta 2t/\beta 2w < 5.0 \tag{4a}$$

$$0.04 < M2/ft < 0.18 \tag{5a}$$

$$1.5 < DM23t/fw < 6.0 \tag{6a}$$

$$0.20 < |f2/f3| < 0.55 \tag{7a}$$

In each example, in order to decrease the effective lens diameter of the first lens unit L1, the number of lenses constituting the first lens unit L1 is set to be as small as possible. In each example, the first lens unit L1 includes, in order from the object side to the image side, negative, positive, and positive lenses (three lenses).

Specifically, the first lens unit L1 includes a cemented lens in which a positive lens and a negative lens are cemented, and a positive lens. Thus, spherical aberration and chromatic aberration that occur when a high zoom ratio are realized is appropriately corrected.

The second lens unit L2 in each example has one or more aspherical surfaces. Specifically, in each example, the aspherical surface is formed on one side or both sides of the lens that is closest to the object side in the second lens unit L2. Thus, lateral chromatic aberration mainly at the wide angle end and field curvature in the entire zoom range are appropriately corrected.

Examples 1 to 3 illustrated in FIGS. 1, 3, and 5 are now described. In the lens cross sectional views of Examples 1 to 3, the first lens unit having positive refractive power is denoted by L1, and the second lens unit having negative refractive power is denoted by L2. The rear group LR includes the third lens unit L3 having negative refractive power, the fourth lens unit L4 having positive refractive power, a fifth lens unit L5 having negative refractive power, and a sixth lens unit L6 having positive refractive power. A six-unit zoom lens system are described in Examples 1 to 3. The first, second, fourth, and sixth lens units L1, L2, L4, and L6 are moved as indicated by arrows for zooming from the wide angle end to the telephoto end.

Specifically, the first lens unit L1 is moved to the object side, the second lens unit L2 is moved to the image side, and the fourth lens unit L4 is moved to the object side, relative to the image plane for zooming from the wide angle end to the telephoto end. Thus, magnification-varying load of the second lens unit L2 when realizing a high zoom ratio is reduced, and the second lens unit L2 is downsized so as to reduce the thickness of the entire camera to which the zoom lens system is applied. In addition, field curvature in the entire zoom range is reduced while high optical performance is obtained over the entire zoom range. The sixth lens unit L6 is moved to the image side and then to the object side, and is further moved to the image side, in a locus with two inflection points. In addition, a rear focus type is adopted, in which the sixth lens unit L6 is moved on the optical axis for focusing. Thus, compared to the case where a front group (the first lens unit L1 and the second lens unit L2) is used for focusing, the entire system is downsized.

When the focusing from an object at infinity to a close object is performed at the telephoto end, the sixth lens unit L6 is sent out to the front as indicated by an arrow 6c. A solid line curve 6a and a broken line curve 6b concerning the sixth lens unit L6 indicate moving loci for correcting image plane fluctuations due to zooming from the wide angle end to the telephoto end when focusing is performed on an object at infinity and on a close object, respectively. In addition, in Examples 1 to 3, the fifth lens unit L5 having negative refractive power may be used for focusing. In this case, the focusing from an object at infinity to a close object is performed by sending out the fifth lens unit L5 to the rear.

In Examples 1 to 3, the prism PR, the third lens unit L3, and the fifth lens unit L5 do not move for zooming. Note that the third lens unit L3 and the fifth lens unit L5 may be moved independently of other lens units as necessary for zooming. Each of the third lens unit L3 and the fifth lens unit L5 is constituted of a single negative lens so that the total lens length is reduced and that the entire system is downsized. The fourth lens unit L4 includes at least one negative lens and two positive lenses so that aberration correction is performed appropriately.

Specifically, the fourth lens unit L4 includes, in order from the object side to the image side, a positive lens, a negative lens, and a cemented lens in which a positive lens and a negative lens are cemented. Thus, spherical aberration and coma aberration in the entire zoom range, as well as coma aberration and lateral chromatic aberration due to decentering in an anti-shake operation are appropriately corrected. In addition, the fourth lens unit L4 has one or more aspherical surfaces. Thus, fluctuation of spherical aberration due to zooming is appropriately corrected. In Examples 1 and 2, the aperture stop SP is disposed in the fourth lens unit L4, while the flare stop FP is disposed on the image side of the fourth lens unit L4, and both of the stops are moved integrally with the fourth lens unit L4 for zooming. In Example 3, the aperture stop SP is disposed on the object side of the fourth lens unit L4 and moves independently for zooming. The flare stop FP is disposed on the image side of the fourth lens unit L4 and moves integrally with the fourth lens unit L4 for zooming.

In Examples 1 to 3, a part or a whole of the fourth lens unit L4 having positive refractive power is moved to have a component in the direction perpendicular to the optical axis, thereby displacing the image in the direction perpendicular to the optical axis. Thus, the blur of the taken image due to shake (tilt) of the entire optical system (zoom lens system) is corrected, with the result that good optical performance is obtained. Note that the fifth lens unit L5 may be moved to have a component in the direction perpendicular to the optical axis instead of a part or a whole of the fourth lens unit L4, so as to correct the blur of the taken image.

In this example and individual examples described below, the anti-shake operation is performed without newly adding an optical member such as a variable angle prism or a lens unit for the anti-shake operation, so as to prevent the entire optical system from becoming large. Note that, in this example and individual examples described below, a whole or a part of the lens unit is moved in the direction perpendicular to the optical axis for the anti-shake operation, but the image blur can be corrected by moving a whole or a part of the lens unit to have a component in the direction perpendicular to the optical axis. For instance, if complication of the barrel structure is allowed, a whole or a part of the lens unit may be rotated with a rotation center on the optical axis for the anti-shake operation.

Example 4 illustrated in FIG. 7 is described. In the lens cross sectional view of Example 4, the first lens unit having positive refractive power is denoted by L1, and the second lens unit having negative refractive power is denoted by L2. The rear group LR includes the third lens unit L3 having positive refractive power, and the fourth lens unit L4 having positive refractive power. A four-unit zoom lens system is described in Example 4. The first, second, third, and fourth lens units L1, L2, L3, and L4 are moved as indicated by arrows for zooming from the wide angle end to the telephoto end. Specifically, the first lens unit L1 is moved to the object side, the second lens unit L2 is moved to the image side, and the third lens unit L3 is moved to the object side for zooming from the wide angle end to the telephoto end. The second lens unit L2 is moved to the image side so that the main magnification-varying is performed. Further, the fourth lens unit L4 is moved to have a locus convex to the object side, so as to correct image plane fluctuation due to the magnification-varying. In addition, the focusing is performed by the fourth lens unit L4. Because the moving locus of the fourth lens unit L4 is convex to the object side, the space between the third lens unit L3 and the fourth lens unit L4 is used effectively, and hence the total lens length can be reduced effectively.

A solid line curve 4a and a broken line curve 4b concerning the fourth lens unit L4 indicate moving loci for correcting image plane fluctuation due to the magnification-varying when focusing is performed on an object at infinity and on a close object, respectively. In addition, when focusing from an object at infinity to a close object is performed at the telephoto end, the fourth lens unit L4 is sent out to the front as indicated by an arrow 4c. In Example 4, the prism PR does not move for zooming. The aperture stop SP is disposed in the third lens unit L3, while the flare stop FP is disposed on the image side of the third lens unit L3, and both of the stops move integrally with the third lens unit L3 in the zooming operation. In Example 4, a part or a whole of the third lens unit L3 is moved to have a component in the direction perpendicular to the optical axis, thereby displacing the image in the direction perpendicular to the optical axis. Thus, the blur of the taken image due to shake (tilt) of the entire optical system (zoom lens system) is corrected, with the result that good optical performance is obtained.

The third lens unit L3 includes at least one negative lens and two positive lenses so that aberration correction is appropriately performed. Specifically, the third lens unit L3 includes a positive lens, a negative lens, and a cemented lens in which a positive lens and a negative lens are cemented. Thus, spherical aberration and coma aberration in the entire zoom range, as well as coma aberration and lateral chromatic aberration due to decentering in the anti-shake operation are appropriately corrected. The third lens unit L3 has one or more aspherical surfaces. Thus, fluctuation of spherical aberration due to zooming is appropriately corrected.

Example 5 illustrated in FIG. 9 is described. In the lens cross sectional view of Example 5, the first lens unit having positive refractive power is denoted by L1, and the second lens unit having negative refractive power is denoted by L2. The rear group LR includes the third lens unit L3 having positive refractive power, the fourth lens unit L4 having negative refractive power, and the fifth lens unit L5 having positive refractive power. A five-unit zoom lens system is described in Example 5. In Example 5, the first, second, third, and fifth lens units L1, L2, L3, and L5 are moved for zooming from the wide angle end to the telephoto end as indicated by arrows. Thus, the magnification-varying of the second lens unit is partially shared, with the result that the second lens unit is made thin and camera thickness is reduced while high zoom ratio is achieved. In addition, field curvature in the entire zoom range is corrected, with the result that good optical performance is obtained.

In Example 5, the first lens unit L1 is moved to the object side, the second lens unit L2 is moved to the image side, and the third lens unit L3 is moved to the object side for zooming from the wide angle end to the telephoto end, relative to the image plane as indicated by arrows. The fifth lens unit L5 is moved to the image side and then to the object side, and is further moved to the image side for zooming, in a locus with two inflection points. A rear focus type is adopted, in which the fifth lens unit L5 is moved on the optical axis for focusing. A solid line curve 5a and a broken line curve 5b concerning the fifth lens unit L5 indicate moving loci for correcting image plane fluctuations due to zooming from the wide angle end to the telephoto end when focusing is performed on an object at infinity and on a close object, respectively.

In each example, for example, when focusing from an object at infinity to a close object is performed at the telephoto end, the fifth lens unit L5 is sent out to the front as indicated by an arrow 5c. In addition, the focusing may be performed by the fourth lens unit L4 having negative refractive power. In this case, the focusing from an object at infinity to a close object is performed by sending out the fourth lens unit L4 to the rear. The aperture stop SP is disposed in the third lens unit L3, while the flare stop FP is disposed on the image side of the third lens unit L3, and both of the stops are moved integrally with the third lens unit L3 in the zooming operation. In Example 5, the prism PR and the fourth lens unit L4 do not move for zooming. Note that the fourth lens unit L4 for zooming may be moved independently of other lens units as necessary. In Example 5, the third lens unit L3 is moved to have a component in the direction perpendicular to the optical axis, thereby displacing the image in the direction perpendicular to the optical axis. Thus, the blur of the taken image due to shake (tilt) of the entire optical system (zoom lens system) is corrected, so that good optical performance is obtained. In Example 5, it is possible to use the fourth lens unit L4 for correcting a shake of a photographing field angle due to vibration of the zoom lens system. The third lens unit L3 includes at least one negative lens and two positive lenses, with the result that aberration correction is appropriately performed. Specifically, the third lens unit L3 includes a positive lens, a negative lens, and a cemented lens in which a positive lens and a negative lens are cemented.

Thus, spherical aberration and coma aberration in the entire zoom range, as well as coma aberration and lateral chromatic aberration due to decentering in the anti-shake operation are appropriately corrected. The third lens unit L3 has one or more aspherical surfaces. Thus, fluctuation of spherical aberration due to zooming is appropriately corrected. In Example 5, the fourth lens unit L4 is constituted of a single negative lens. Thus, the total lens length is reduced, and hence the camera is downsized. The fifth lens unit L5 is constituted of a single positive lens. According to each example, with the structure described above, it is possible to provide the zoom lens system with a small size of the entire optical system, a high zoom ratio of approximately 10, and high optical performance over the entire zoom range. In addition, because the zoom lens system of each example includes the reflecting member PR for bending the light coming from the object side between the second lens unit L2 and the third lens unit L3 as illustrated in FIG. 11, the size of the camera in the thickness direction can be easily reduced.

Reference numerals that denote members in FIG. 11 are the same as those indicated in the figures. Next, in each example, a digital still camera in which the zoom lens system according to each example is used as a photographing optical system is described with reference to FIG. 12. In FIG. 12, the digital still camera includes a camera main body 20 and a photographing optical system 21 constituted by any one of the zoom lens systems described in Examples 1 to 5. The digital still camera also includes a camera main body 20 and a photographing optical system 21 constituted of any one of the zoom lens systems described above in Examples 1 to 5. PR refers to a prism. The digital still camera also includes a solid-state image pickup element (photoelectric transducer element) 22 such as a CCD sensor or a CMOS sensor incorporated in the camera main body for receiving an image of a subject formed by the photographing optical system 21. The digital still camera also includes a memory 23 for recording information corresponding to the image of a subject, on which photoelectric conversion has been performed by the solid-state image pickup element 22. The digital still camera also includes a finder 24 constituted of a liquid crystal display panel or the like for observing the image of a subject formed on the solid-state image pickup element 22. In this way, by using the zoom lens system according to the present invention for an image pickup apparatus such as a digital still camera, it is possible to provide a small-sized image pickup apparatus having high optical performance.

Next, Numerical Examples 1 to 5 corresponding respectively to Examples 1 to 5 of the present invention are described. In each Numerical Example, i denotes an order of an optical surface from the object side, ri denotes a curvature radius of the i-th optical surface (i-th surface), di denotes a distance between the i-th surface and an (i+1)th surface, ndi and vdi respectively denote a refractive index and an Abbe number of material of the i-th optical member with respect to the d-line. In addition, k denotes an eccentricity, A4, A6, A8, and A10 denote aspherical coefficients, and a displacement in the optical axis direction at a position of height h from the optical axis with respect to a surface apex is denoted by x. Then, the aspherical shape is expressed by the following equation.

$$x=(h^2/R)/[1+[1-(1+k)(h/R)^2]^{1/2}]+A4h^4+A6h^6+A8h^8$$

where R denotes a paraxial curvature radius. In addition, for example, the expression of "E-Z" means $10^{-Z}$. The last two surfaces in Numerical Examples are surfaces of the optical block such as a filter, a face plate, or the like. In each example, a back focus (BF) indicates a distance between the lens end surface and the paraxial image plane as an air-converted length. The total lens length is a distance between the surface closest to the object side and the final surface plus the back focus. In addition, correspondence between each Numerical Example and the above-mentioned conditional expression is shown in Table 1.

Numerical Example 1

| Unit: mm | | | | |
|---|---|---|---|---|
| Surface data | | | | |
| Surface Number | r | d | nd | vd |
| 1 | 34.069 | 1.00 | 1.84666 | 23.9 |
| 2 | 19.659 | 4.00 | 1.60311 | 60.6 |
| 3 | 120.229 | 0.10 | | |
| 4 | 20.434 | 2.50 | 1.69680 | 55.5 |
| 5 | 73.395 | (Variable) | | |
| 6 | 327.566 | 0.80 | 1.84954 | 40.1 |
| 7* | 5.888 | 4.00 | | |
| 8 | −12.349 | 0.60 | 1.88300 | 40.8 |
| 9 | 45.742 | 0.10 | | |
| 10 | 22.231 | 2.10 | 1.94595 | 18.0 |
| 11 | −23.709 | (Variable) | | |
| 12 | ∞ | 8.50 | 1.83400 | 37.2 |
| 13 | ∞ | 0.80 | | |
| 14 | −16.680 | 0.60 | 1.80518 | 25.4 |
| 15 | −23.146 | (Variable) | | |
| 16* | 9.602 | 2.30 | 1.55332 | 71.7 |
| 17* | −39.480 | 1.00 | | |
| 18 (Stop) | ∞ | 1.00 | | |
| 19 | 11.792 | 0.70 | 1.84666 | 23.9 |
| 20 | 7.863 | 0.70 | | |
| 21* | 28.350 | 2.00 | 1.55332 | 71.7 |
| 22 | −7.457 | 0.60 | 1.77250 | 49.6 |
| 23 | −16.922 | 0.35 | | |
| 24 (Flare stop) | ∞ | (Variable) | | |
| 25 | −23.266 | 0.70 | 1.48749 | 70.2 |
| 26 | 57.732 | (Variable) | | |
| 27 | 15.839 | 2.60 | 1.48749 | 70.2 |
| 28 | −30.026 | (Variable) | | |
| 29 | ∞ | 1.00 | 1.51633 | 64.1 |
| 30 | ∞ | 1.0 | | |
| Image plane | ∞ | | | |

Aspherical surface data

Seventh surface

K = −1.71269e−001 A4 = −2.50781e−005
Sixteenth surface

K = −1.71698e+000 A4 = 9.69184e−005 A6 = −1.01040e−006
A8 = 1.76003e−008
Seventeenth surface K = 1.79790e+001 A4 = 5.87754e−006
Twenty-first surface K = 6.18823e+000 A4 = −7.36522e−005

| Various data | | | | | |
|---|---|---|---|---|---|
| Zoom ratio 9.50 | | | | | |
| Focal length | 5.13 | 11.50 | 48.74 | 36.04 | 5.83 |
| F-number | 3.40 | 4.69 | 5.74 | 5.27 | 3.62 |
| Field angle | 33.31 | 18.62 | 4.55 | 6.14 | 30.90 |
| Image height | 3.37 | 3.88 | 3.88 | 3.88 | 3.49 |
| Total lens length | 75.53 | 76.63 | 85.46 | 84.11 | 75.33 |
| BF | 9.56 | 7.44 | 6.87 | 9.90 | 8.81 |
| d5 | 0.60 | 4.17 | 15.48 | 13.88 | 0.89 |
| d11 | 6.02 | 3.54 | 1.06 | 1.31 | 5.52 |
| d15 | 13.66 | 6.22 | 0.30 | 0.65 | 12.36 |
| d24 | 1.48 | 8.92 | 14.84 | 14.49 | 2.78 |
| d26 | 7.17 | 9.28 | 9.85 | 6.83 | 7.92 |
| d28 | 7.90 | 5.78 | 5.21 | 8.24 | 7.15 |

| Zoom lens unit data | | |
|---|---|---|
| Unit | First surface | Focal length |
| 1 | 1 | 31.36 |
| 2 | 6 | −7.25 |
| 3 | 12 | −77.36 |
| 4 | 16 | 14.15 |
| 5 | 25 | −33.92 |
| 6 | 27 | 21.67 |
| 7 | 29 | ∞ |

Numerical Example 2

| Unit: mm | | | | |
|---|---|---|---|---|
| Surface data | | | | |
| Surface Number | r | d | nd | vd |
| 1 | 37.973 | 1.20 | 1.84666 | 23.9 |
| 2 | 21.912 | 3.75 | 1.48749 | 70.2 |
| 3 | 50000.000 | 0.10 | | |
| 4 | 21.042 | 2.30 | 1.69680 | 55.5 |
| 5 | 97.541 | (Variable) | | |
| 6 | 569.747 | 1.05 | 1.85135 | 40.1 |
| 7* | 7.490 | 3.88 | | |
| 8 | −15.594 | 0.60 | 1.71300 | 53.9 |
| 9 | 39.087 | 0.10 | | |
| 10 | 20.359 | 1.85 | 1.94595 | 18.0 |
| 11 | −86.093 | (Variable) | | |
| 12 | ∞ | 8.50 | 1.83400 | 37.2 |
| 13 | ∞ | 1.40 | | |
| 14 | −11.967 | 0.60 | 1.51633 | 64.1 |
| 15 | −18.110 | (Variable) | | |
| 16* | 9.944 | 2.50 | 1.55332 | 71.7 |
| 17* | −36.069 | 1.50 | | |

-continued

Unit: mm

| | | | | |
|---|---|---|---|---|
| 18 (Stop) | ∞ | 1.00 | | |
| 19 | 12.222 | 0.60 | 1.84666 | 23.9 |
| 20 | 7.719 | 1.3 | | |
| 21 | 18.265 | 2.10 | 1.48749 | 70.2 |
| 22 | −12.411 | 0.60 | 1.77250 | 49.6 |
| 23 | −25.912 | 0.3 | | |
| 24 (Flare stop) | ∞ | (Variable) | | |
| 25 | −32.690 | 0.70 | 1.48749 | 70.2 |
| 26 | 32.690 | (Variable) | | |
| 27 | 16.906 | 2.00 | 1.48749 | 70.2 |
| 28 | −38.134 | (Variable) | | |
| 29 | ∞ | 1.00 | 1.51633 | 64.1 |
| 30 | ∞ | 1.0 | | |
| Image plane | ∞ | | | |

Aspherical surface data

Seventh surface

K = −1.28711e−001 A4 = −1.40311e−005 A6 = −4.83079e−007
Sixteenth surface

K = −6.09172e−001 A4 = −3.96922e−005 A6 = 2.92135e−008
A8 = −1.13412e−009
Seventeenth surface K = −6.89933e−001 A4 = 2.56587e−005

Various data
Zoom ratio 9.48

| Focal length | 6.48 | 21.19 | 61.49 | 55.37 | 8.68 |
|---|---|---|---|---|---|
| F-number | 3.48 | 4.99 | 5.74 | 5.51 | 4.06 |
| Field angle | 29.07 | 10.36 | 3.61 | 4.00 | 24.05 |
| Image height | 3.60 | 3.88 | 3.88 | 3.88 | 3.88 |
| Total lens length | 83.54 | 84.88 | 88.07 | 87.88 | 83.30 |
| BF | 10.46 | 12.29 | 7.90 | 9.80 | 8.49 |
| d5 | 0.75 | 7.57 | 15.31 | 14.87 | 1.54 |
| d11 | 10.82 | 5.34 | 0.79 | 1.04 | 9.79 |
| d15 | 13.46 | 2.63 | 0.44 | 0.43 | 10.33 |
| d24 | 2.52 | 13.34 | 15.54 | 15.55 | 5.65 |
| d26 | 7.59 | 5.77 | 10.16 | 8.26 | 9.57 |
| d28 | 8.80 | 10.63 | 6.24 | 8.14 | 6.83 |

Zoom lens unit data

| Unit | First surface | Focal length |
|---|---|---|
| 1 | 1 | 31.57 |
| 2 | 6 | −8.59 |
| 3 | 12 | −70.68 |
| 4 | 16 | 22.65 |
| 5 | 21 | 30.09 |
| 6 | 24 | ∞ |
| 7 | 25 | −33.41 |
| 8 | 27 | 24.32 |
| 9 | 29 | ∞ |

Numerical Example 3

Unit: mm

Surface data

| Surface Number | r | d | nd | vd |
|---|---|---|---|---|
| 1 | 45.965 | 1.10 | 1.84666 | 23.9 |
| 2 | 20.646 | 4.50 | 1.59282 | 68.6 |
| 3 | 148.532 | 0.10 | | |
| 4 | 23.640 | 2.70 | 1.88300 | 40.8 |
| 5 | 97.500 | (Variable) | | |
| 6 | 121.445 | 1.00 | 1.84954 | 40.1 |

-continued

Unit: mm

| | | | | |
|---|---|---|---|---|
| 7* | 5.321 | 3.40 | | |
| 8 | −10.529 | 0.60 | 1.88300 | 40.8 |
| 9 | 63.694 | 0.10 | | |
| 10 | 20.440 | 1.60 | 1.94595 | 18.0 |
| 11 | −25.819 | (Variable) | | |
| 12 | ∞ | 8.00 | 1.83400 | 37.2 |
| 13 | ∞ | 0.70 | | |
| 14 | −17.119 | 0.50 | 1.48749 | 70.2 |
| 15 | −32.274 | (Variable) | | |
| 16 (Stop) | ∞ | (Variable) | | |
| 17* | 6.917 | 2.80 | 1.55332 | 71.7 |
| 18* | −39.185 | 0.94 | | |
| 19 | 16.248 | 0.56 | 1.83400 | 37.2 |
| 20 | 6.106 | 1.08 | | |
| 21 | 8.956 | 3.10 | 1.48749 | 70.2 |
| 22 | −8.123 | 0.60 | 1.83481 | 42.7 |
| 23 | −16.065 | 0.40 | | |
| 24 (Flare stop) | ∞ | (Variable) | | |
| 25 | 43.211 | 0.60 | 1.48749 | 70.2 |
| 26 | 9.520 | (Variable) | | |
| 27 | 10.837 | 3.90 | 1.48749 | 70.2 |
| 28 | −11.910 | 0.50 | 1.83400 | 37.2 |
| 29 | −18.581 | (Variable) | | |
| 30 | ∞ | 1.00 | 1.51633 | 64.1 |
| 31 | ∞ | 1.0 | | |
| Image plane | ∞ | | | |

Aspherical surface data

Seventh surface

K = −6.21150e−002 A4 = −1.25254e−004 A6 = −3.37844e−006
A8 = −8.30551e−008
Seventeenth surface K = −5.18633e−001 A4 = −4.18160e−005 A6 = 3.45532e−007
A8 = 7.52442e−009
Eighteenth surface K = −4.99082e+000 A4 = 8.48305e−005

Various data
Zoom ratio 9.49

| Focal length | 4.07 | 9.04 | 38.60 | 26.76 | 4.66 |
|---|---|---|---|---|---|
| F-number | 3.60 | 4.50 | 5.74 | 5.00 | 3.80 |
| Field angle | 37.36 | 21.56 | 5.28 | 7.60 | 34.57 |
| Image height | 3.11 | 3.57 | 3.57 | 3.57 | 3.21 |
| Total lens length | 73.92 | 74.49 | 88.44 | 86.00 | 73.71 |
| BF | 8.17 | 5.31 | 5.92 | 8.45 | 7.27 |
| d5 | 0.40 | 1.98 | 16.93 | 14.39 | 0.40 |
| d11 | 3.00 | 2.00 | 0.99 | 1.09 | 2.80 |
| d15 | 8.55 | 4.56 | 1.45 | 1.54 | 7.99 |
| d16 | 8.29 | 3.75 | 1.46 | 1.54 | 7.27 |
| d24 | 0.58 | 9.11 | 14.51 | 14.33 | 2.16 |
| d26 | 6.15 | 9.01 | 8.41 | 5.88 | 7.06 |
| d29 | 6.51 | 3.65 | 4.26 | 6.79 | 5.61 |

Zoom lens unit data

| Unit | First surface | Focal length |
|---|---|---|
| 1 | 1 | 32.94 |
| 2 | 6 | −6.29 |
| 3 | 12 | −75.60 |
| 4 | 16 | ∞ |
| 5 | 17 | 13.51 |
| 6 | 25 | −25.19 |
| 7 | 27 | 17.04 |
| 8 | 30 | ∞ |

Numerical Example 4

Unit: mm

Surface data

| Surface Number | r | d | nd | vd |
|---|---|---|---|---|
| 1 | 40.213 | 1.00 | 1.84666 | 23.9 |
| 2 | 20.408 | 4.20 | 1.60311 | 60.6 |
| 3 | 218.636 | 0.10 | | |
| 4 | 20.336 | 3.00 | 1.77250 | 49.6 |
| 5 | 75.668 | (Variable) | | |
| 6 | 5123.699 | 0.80 | 1.84954 | 40.1 |
| 7* | 5.900 | 3.60 | | |
| 8 | −11.868 | 0.60 | 1.88300 | 40.8 |
| 9 | 44.417 | 0.10 | | |
| 10 | 22.111 | 1.80 | 1.94595 | 18.0 |
| 11 | −29.636 | (Variable) | | |
| 12 | ∞ | 8.80 | 1.83400 | 37.2 |
| 13 | ∞ | (Variable) | | |
| 14* | 9.888 | 2.30 | 1.55332 | 71.7 |
| 15* | −82.783 | 1.00 | | |
| 16 (Stop) | ∞ | 1.00 | | |
| 17 | 11.031 | 0.70 | 1.84666 | 23.9 |
| 18 | 7.420 | 0.70 | | |
| 19* | 28.087 | 2.00 | 1.55332 | 71.7 |
| 20 | −7.278 | 0.60 | 1.77250 | 49.6 |
| 21 | −17.809 | 0.35 | | |
| 22 (Flare stop) | ∞ | (Variable) | | |
| 23 | 12.719 | 2.20 | 1.77250 | 49.6 |
| 24 | 69.647 | 0.70 | 1.94595 | 18.0 |
| 25 | 29.795 | (Variable) | | |
| 26 | ∞ | 1.00 | 1.51633 | 64.1 |
| 27 | ∞ | 1.0 | | |
| Image plane | ∞ | | | |

Aspherical surface data

Seventh surface

K = −1.65329e−001 A4 = −1.83577e−005

Fourteenth surface

K = −2.27427e+000 A4 = 1.12081e−004 A6 = −9.48568e−007 A8 = −6.99943e−008

Fifteenth surface

K = 4.80045e+001 A4 = −4.22357e−005

Nineteenth surface

K = 2.82756e+001 A4 = −2.53664e−005

Various data
Zoom ratio 9.50

| Focal length | 5.13 | 8.34 | 48.74 | 32.24 | 5.38 |
|---|---|---|---|---|---|
| F-number | 3.60 | 4.30 | 5.45 | 5.04 | 3.70 |
| Field angle | 33.31 | 24.92 | 4.55 | 6.85 | 32.96 |
| Image height | 3.37 | 3.88 | 3.88 | 3.88 | 3.49 |
| Total lens length | 72.16 | 71.67 | 82.16 | 80.41 | 71.53 |
| BF | 6.79 | 8.24 | 6.65 | 10.95 | 6.86 |
| d5 | 0.60 | 2.52 | 15.42 | 13.43 | 0.45 |
| d11 | 5.23 | 2.82 | 0.41 | 0.65 | 4.75 |
| d13 | 13.56 | 8.04 | 0.19 | 0.96 | 12.86 |
| d22 | 10.43 | 14.50 | 23.94 | 18.88 | 11.06 |
| d25 | 5.13 | 6.58 | 4.99 | 9.29 | 5.20 |

Zoom lens unit data

| Unit | First surface | Focal length |
|---|---|---|
| 1 | 1 | 29.31 |
| 2 | 6 | −6.23 |
| 3 | 12 | ∞ |
| 4 | 14 | 16.62 |
| 5 | 23 | 29.07 |
| 6 | 26 | ∞ |

Numerical Example 5

Unit: mm

Surface data

| Surface Number | r | d | nd | vd |
|---|---|---|---|---|
| 1 | 34.478 | 1.00 | 1.84666 | 23.9 |
| 2 | 19.812 | 4.00 | 1.60311 | 60.6 |
| 3 | 134.710 | 0.10 | | |
| 4 | 20.564 | 2.50 | 1.69680 | 55.5 |
| 5 | 83.141 | (Variable) | | |
| 6 | 289.256 | 0.80 | 1.84954 | 40.1 |
| 7* | 5.736 | 3.80 | | |
| 8 | −11.857 | 0.60 | 1.88300 | 40.8 |
| 9 | 38.221 | 0.10 | | |
| 10 | 18.923 | 1.80 | 1.94595 | 18.0 |
| 11 | −33.260 | (Variable) | | |
| 12 | ∞ | 8.30 | 1.83400 | 37.2 |
| 13 | ∞ | (Variable) | | |
| 14* | 9.420 | 2.30 | 1.55332 | 71.7 |
| 15* | −49.606 | 1.00 | | |
| 16 (Stop) | ∞ | 1.00 | | |
| 17 | 12.186 | 0.70 | 1.84666 | 23.9 |
| 18 | 7.627 | 0.70 | | |
| 19* | 23.586 | 2.00 | 1.55332 | 71.7 |
| 20 | −7.223 | 0.60 | 1.77250 | 49.6 |
| 21 | −16.344 | 0.35 | | |
| 22 (Flare stop) | ∞ | (Variable) | | |
| 23 | −22.182 | 0.70 | 1.48749 | 70.2 |
| 24 | 69.843 | (Variable) | | |
| 25 | 15.144 | 2.60 | 1.48749 | 70.2 |
| 26 | −28.336 | (Variable) | | |
| 27 | ∞ | 1.00 | 1.51633 | 64.1 |
| 28 | ∞ | 0.5 | | |
| Image plane | ∞ | | | |

Aspherical surface data

Seventh surface

K = −2.56130e−002 A4 = −4.70562e−005

Fourteenth surface

K = −1.56620e+000 A4 = 1.20103e−004 A6 = −1.26808e−006 A8 = 5.13438e−008

Fifteenth surface

K = 2.00477e+001 A4 = 4.31458e−005

Nineteenth surface

K = 1.11736e+001 A4 = −6.85687e−005

Various data
Zoom ratio 9.50

| Focal length | 5.13 | 11.92 | 48.74 | 36.08 | 5.87 |
|---|---|---|---|---|---|
| F-number | 3.31 | 4.77 | 5.74 | 5.24 | 3.56 |
| Field angle | 33.32 | 18.01 | 4.55 | 6.13 | 30.73 |
| Image height | 3.37 | 3.88 | 3.88 | 3.88 | 3.49 |
| Total lens length | 73.14 | 73.96 | 82.27 | 80.99 | 72.89 |
| BF | 8.75 | 5.95 | 6.20 | 9.10 | 7.90 |
| d5 | 0.60 | 3.91 | 14.73 | 13.20 | 0.85 |
| d11 | 6.01 | 3.51 | 1.01 | 1.26 | 5.51 |
| d13 | 14.35 | 6.45 | 0.18 | 0.56 | 12.93 |
| d22 | 2.33 | 10.24 | 16.50 | 16.13 | 3.75 |
| d24 | 6.15 | 8.95 | 8.70 | 5.80 | 7.00 |
| d26 | 7.59 | 4.79 | 5.04 | 7.95 | 6.74 |

Zoom lens unit data

| Unit | First surface | Focal length |
|---|---|---|
| 1 | 1 | 30.30 |
| 2 | 6 | −6.17 |
| 3 | 12 | ∞ |
| 4 | 14 | 14.66 |

-continued

Unit: mm

| | | |
|---|---|---|
| 5 | 23 | −34.45 |
| 6 | 25 | 20.65 |
| 7 | 27 | ∞ |

TABLE 1

| Conditional expression | Example 1 | Example 2 | Example 3 | Example 4 | Example 5 |
|---|---|---|---|---|---|
| (1) $0.1 < |M1/M2| < 20.0$ | 2.005 | 0.451 | 7.233 | 2.073 | 1.825 |
| (2) $0.050 < |f2/ft| < 0.175$ | 0.149 | 0.140 | 0.163 | 0.128 | 0.127 |
| (3) $4.5 < f1/fw < 10.0$ | 6.114 | 4.869 | 8.095 | 5.714 | 5.909 |
| (4) $3.0 < \beta 2t/\beta 2w < 6.0$ | 3.839 | 4.210 | 3.559 | 4.725 | 3.488 |
| (5) $0.02 < M2/ft < 0.20$ | 0.102 | 0.163 | 0.052 | 0.099 | 0.103 |
| (6) $1.0 < DM23t/fw < 10.0$ | 2.197 | 1.809 | 3.220 | 1.833 | 1.849 |
| (7) $0.1 < |f2/f3| < 0.6$ | 0.512 | 0.379 | 0.465 | 0.375 | 0.421 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-163029, filed Jul. 20, 2010, which is hereby incorporated by reference herein in its entirety.

What is claimed is:

1. A zoom lens system comprising, in order from an object side to an image side:
   a first lens unit having a positive refractive power;
   a second lens unit having a negative refractive power;
   a reflection member for bending an optical path; and
   a rear group comprising a plurality of lens units, including a third lens unit provided at a position nearer, along an optical path direction, to the object side than any other lens unit among the plurality of lens unit of the rear group,
   wherein the first lens unit is configured to move to the object side while the second lens unit is configured to move to the image side with respect to an imaging plane while zooming from a wide angle end to a telephoto end, and
   wherein the following conditional expressions are satisfied:

$0.1<|M1/M2|<20.0;$ $0.050<|f2/ft|<0.175;$ and $1.809 \leq DM23t/fw<10.0,$ where M1 and M2 denote movement amounts of the first lens unit and the second lens unit, respectively, with respect to the image plane in zooming from the wide angle end to the telephoto end, f2 denotes a focal length of the second lens unit, DM23t denotes an interval on an optical axis at the telephoto end, between a lens that is thirdly disposed from the objective side, among lens units that move during zooming, and the second lens unit, fw denotes a focal length of the zoom lens system at the wide angle end, and ft denotes a focal length of the zoom lens system at the telephoto end.

2. A zoom lens system according to claim 1, wherein the following conditional expression is satisfied:

$4.5<f1/fw<10.0,$ where f1 denotes a focal length of the first lens unit.

3. A zoom lens system according to claim 1, wherein the following conditional expression is satisfied:

$3.0<\beta 2t/\beta 2w<6.0,$ where $\beta 2w$ and $\beta 2t$ represent lateral magnifications of the second lens unit at the wide angle end and at the telephoto end, respectively.

4. A zoom lens system according to claim 1, wherein the following conditional expression is satisfied:

$0.02<M2/ft<0.2.$

5. A zoom lens system according to claim 1, wherein the following conditional expression is satisfied:

$0.1<|f2/f3|<0.6,$ where fM3 denotes a focal length of the lens unit that is thirdly disposed from the object side, among lens units that move during zooming.

6. A zoom lens system according to claim 1, wherein:
   the rear group comprises, in order from the object side to the image side, the third lens unit having a negative refractive power, a fourth lens unit having a positive refractive power, a fifth lens unit having a negative refractive power, and a sixth lens unit having a positive refractive power, and
   the third lens unit and the fifth lens unit are configured to not move during zooming, while the fourth lens unit and the sixth lens unit are configured to move during zooming.

7. A zoom lens system according to claim 6, wherein the third lens unit comprises a single negative lens.

8. A zoom lens system according to claim 6, wherein the fifth lens unit comprises a single negative lens.

9. A zoom lens system according to claim 6, wherein the fourth lens unit is configured to be moved to have a component in a direction perpendicular to an optical axis direction so that blur of a taken image due to shake of the zoom lens system is corrected.

10. A zoom lens system according to claim 1, wherein:
    the rear group comprises, in order from the object side to the image side, the third lens unit having a positive refractive power and a fourth lens unit having a positive refractive power, and
    the third lens unit and the fourth lens unit are configured to move during zooming.

11. A zoom lens system according to claim 1, wherein:
    the rear group comprises, in order from the object side to the image side, the third lens unit having a positive refractive power, a fourth lens unit having a negative refractive power, and a fifth lens unit having a positive refractive power, and
    the fourth lens unit is configured to not move for during zooming, while the third lens unit and the fifth lens unit are configured to move during zooming.

12. A zoom lens system according to claim 11, wherein the fourth lens unit comprises a single negative lens.

13. A zoom lens system according to claim 10, wherein the third lens unit is configured to be moved to have a component in a direction perpendicular to an optical axis direction so that blur of a taken image due to shake of the zoom lens system is corrected.

14. A zoom lens system according to claim 1, wherein an image is formed on a solid-state image pickup element.

15. An image pickup apparatus comprising:
a zoom lens; and
an image sensor configured to receive an image formed by the zoom lens,
wherein the zoom lens comprises, in order from an object side to an image side:
a first lens unit having a positive refractive power;
a second lens unit having a negative refractive power;
a reflection member for bending an optical path; and
a rear group comprising a plurality of lens units, including a third lens unit provided at a position nearer, along an optical path direction, to the object side than any other lens unit among the plurality of lens unit of the rear group,
wherein the first lens unit is configured to move to the object side while the second lens unit is configured to move to the image side with respect to an imaging plane while zooming from a wide angle end to a telephoto end, and
wherein the following conditional expressions are satisfied:

$$0.1 < |M1/M2| < 20.0;$$

$$0.050 < |f2/ft| < 0.175; \text{ and}$$

$$1.809 \leq DM23t/fw < 10.0,$$

where M1 and M2 denote movement amounts of the first lens unit and the second lens unit, respectively, with respect to the image plane in zooming from the wide angle end to the telephoto end, f2 denotes a focal length of the second lens unit, DM23$t$ denotes an interval on an optical axis at the telephoto end, between a lens unit that is thirdly disposed from the object side, among lens units that move during zooming, and the second lens unit, fw denotes a focal length of the zoom lens system at the wide angle end, and ft denotes a focal length of the zoom lens system at the telephoto end.

* * * * *